United States Patent
Matsushita et al.

(10) Patent No.: US 6,812,303 B1
(45) Date of Patent: Nov. 2, 2004

(54) OLEFIN POLYMERIZAION CATALYST AND METHOD FOR POLYMERIZING AN OLEFIN USING THE CATALYST

(75) Inventors: Fumio Matsushita, Kurashiki (JP); Akio Fujiwara, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/569,579

(22) Filed: May 10, 2000

Related U.S. Application Data

(63) Continuation-in-part of application No. PCT/JP98/05276, filed on Nov. 24, 1998.

(30) Foreign Application Priority Data

Dec. 1, 1997 (JP) .............................................. 9-343632

(51) Int. Cl.$^7$ ................................................. C08F 4/64
(52) U.S. Cl. ....................... 526/133; 502/120; 502/124; 502/128; 502/155; 502/158; 526/129; 526/133; 526/160; 526/161
(58) Field of Search ................................ 502/120, 124, 502/152, 155, 158, 104; 528/160, 165, 129, 133, 134

(56) References Cited

U.S. PATENT DOCUMENTS

| | | | |
|---|---|---|---|
| 5,064,802 A | | 11/1991 | Stevens et al. |
| 5,444,134 A | * | 8/1995 | Matsumoto ................. 526/159 |
| 5,461,127 A | * | 10/1995 | Naganuma et al. ......... 526/127 |
| 5,783,512 A | * | 7/1998 | Jacobsen et al. ............ 502/124 |
| 6,013,819 A | | 1/2000 | Stevens et al. |
| 6,017,842 A | * | 1/2000 | Rosen et al. ................. 502/124 |

FOREIGN PATENT DOCUMENTS

| | | |
|---|---|---|
| WO | WO8805793 | 8/1988 |
| WO | WO9311172 | 6/1993 |
| WO | WO500526 | 1/1995 |
| WO | WO9628480 | 9/1996 |
| WO | WO9743323 | 11/1997 |
| WO | WO9827119 | 6/1998 |

* cited by examiner

Primary Examiner—Caixia Lu
(74) Attorney, Agent, or Firm—Birch, Stewart, Kolasch & Birch, LLP

(57) ABSTRACT

A novel olefin polymerization catalyst comprising: (A) a transition metal compound comprising a transition metal having η-bonded thereto a cyclic anionic ligand; (B) a mixture of (B-1) an activator compound capable of forming, together with component (A), a metal complex having a catalytic activity and (B-2) an organometal compound, the activator compound (B-1) comprising a cation and a noncoordinating, compatible anion; (C) a solid component; and optionally (D) an organoaluminum compound, wherein the catalyst is obtained by contacting components (A) to (C) and optionally component (D). The olefin polymerization catalyst of the present invention is advantageous not only in that it has high polymerization activity, but also in that an olefin polymer having excellent powder characteristics can be efficiently produced by suspension polymerization (slurry polymerization) or gaseous phase polymerization in a continuous manner, using a commercial scale plant, while preventing the occurrence of adherence of the polymer to the inside surfaces associated with a polymerizer.

9 Claims, No Drawings

OLEFIN POLYMERIZAION CATALYST AND METHOD FOR POLYMERIZING AN OLEFIN USING THE CATALYST

This application is a continuation-in-part of PCT application No. PCT/JP98/05276, filed on Nov. 24, 1998, which designated the United States and on which priority is claimed under 35 U.S.C. § 120.

BACKGROUND OF THE INVENTION

1. Field of the Invention

The present invention relates to a novel olefin polymerization catalyst and a method for polymerizing an olefin using the catalyst. More particularly, the present invention is concerned with a novel olefin polymerization catalyst comprising: (A) a transition metal compound comprising a transition metal having η-bonded thereto a cyclic anionic ligand; (B) a mixture of (B-1) an activator compound and (B-2) a specific organometal compound containing an element selected from elements of Groups 1 to 15 of the Periodic Table, the activator compound (B-1) comprising a cation and a noncoordinating, compatible anion and being capable of reacting with the transition metal compound (A) to form a metal complex having a catalytic activity; (C) a solid component having substantially no hydroxyl group; and optionally (D) an organoaluminum compound, wherein the catalyst is obtained by contacting components (A) to (C) and optionally component (D). The olefin polymerization catalyst of the present invention is advantageous not only in that it has high polymerization activity, but also in that an olefin polymer having excellent powder characteristics can be produced by suspension polymerization (slurry polymerization) or gaseous phase polymerization, while preventing the occurrence of adherence of the polymer to the inner wall, agitation blades and the like of a polymerizer. By virtue of such excellent properties, the catalyst of the present invention enables an olefin polymer having excellent powder characteristics to be efficiently produced by a continuous operation of a commercial scale plant. The olefin polymer produced by using the catalyst of the present invention can be advantageously used for producing various articles, such as films, molded articles (such as blow-molded articles, injection-molded articles and rotomolded articles), fibers, pipes, and coating or jacketing materials for electric transmission cables or wires. The present invention is also concerned with a method for producing an olefin homopolymer or olefin copolymer by using this catalyst.

2. Prior Art

Ziegler-Natta catalysts comprising a titanium compound and an organoaluminum compound have been widely known as a catalyst for producing olefin homopolymers and olefin copolymers.

On the other hand, it has recently been found that when a catalyst system comprising a solvent-soluble transition metal compound containing a halide, such as bis(cyclopentadienyl)zirconium dichloride, and an aluminoxane, which is one type of organoaluminumoxy compound, is used for homopolymerization of ethylene or copolymerization of ethylene with an α-olefin, the catalyst system exhibits high polymerization activity. With respect to the details of this technique, reference can be made to, for example, Examined Japanese Patent Application Publication No. 4-12283 (corresponding to DE 3127133.2).

In Unexamined Japanese Patent Application Laid-Open Specification Nos. 60-35006, 60-35007 and 60-35008 (each corresponding to U.S. Pat. No. 4,937,299), it has been proposed to use, as the transition metal compound component of the above catalyst system comprising a transition metal compound and an aluminoxane, a mixture of at least two metallocenes or a substituted metallocene, so as to control the molecular weight and molecular weight distribution of a final ethylene polymer or to improve the copolymerizability of ethylene with an α-olefin.

The catalyst systems proposed in the above-described prior art documents, each comprising a transition metal compound and an organoaluminumoxy compound, are soluble in a polymerization solvent. Therefore, difficult to securely support such a catalyst system on a carrier by a conventional catalyst-supporting method, for example, a method in which both a solution of the catalyst system and a dispersion obtained by dispersing a carrier in a non-solvent for the catalyst system are provided, and the solution of the catalyst system is added to the dispersion containing the non-solvent for the catalyst system, thereby causing the catalyst system to be precipitated and supported on the carrier. When such a catalyst system supported on a carrier by a conventional carrier-supporting method is used in a suspension polymerization or gaseous phase polymerization, a problem arises in that the catalyst system is caused to separate from the carrier during the polymerization so that, as well-known in the art, the catalyst system which has separated from the carrier disadvantageously produces an indefinite form of polymer, rendering it difficult to handle the polymer. Thus, only a polymer having poor powder characteristics is produced. Further, during the polymerization, such an indefinite-form polymer tends to easily adhere to various inside surfaces associated with the polymerizer, such as the inner wall of the polymerizer, the agitation blades, the outer wall of the thermometer and the like, thus forming polymer scales adhering to such inside surfaces. In addition, a part of the catalyst system which has separated from the carrier adheres to the above-mentioned various inside surfaces associated with the polymerizer during the polymerization, so that a polymerization occurs at such inside surfaces, thus forming polymer scales adhering to such inside surfaces. As well-known in the art, the adhesion of the polymer scales to the inside surfaces associated with the polymerizer poses serious problems in that excess heat cannot be efficiently removed from the polymerizer, that the agitation efficiency of the agitation blades is lowered, and that the reaction temperature cannot be accurately measured with the thermometer. These problems make it impossible to continuously perform the polymerization. Therefore, such catalyst systems (comprising a transition metal compound and an organoaluminumoxy compound) cannot be used for commercial scale production of olefin polymers by suspension polymerization or gaseous phase polymerization. Accordingly, the use of these catalyst systems is inevitably limited to a solution polymerization process. However, a solution polymerization process has a problem in that when it is attempted to produce a polymer having a high molecular weight by solution polymerization, the viscosity of the solution of the polymer is considerably increased, so that the productivity of the process becomes very low. Therefore, these catalyst systems are disadvantageous in that commercial application of them is very difficult.

In order to solve the above-mentioned problems, it has been attempted to polymerize an olefin by suspension polymerization or gaseous phase polymerization, using a catalyst comprising a porous inorganic oxide as a carrier, such as silica, alumina or silica-alumina and, carried thereon, at least one compound selected from the group consisting of a transition metal compound and an organoaluminumoxy compound.

For example, Unexamined Japanese Patent Application Laid-Open Specification Nos. 60-106808 and 60-106809 (both of which correspond to EP 0142143) disclose a method in which a first filler is contacted with a highly active catalyst component comprising a hydrocarbon solvent-soluble titanium compound and/or a hydrocarbon solvent-soluble zirconium compound, thereby obtaining a contact-treatment product, and ethylene is homopolymerized or copolymerized with an α-olefin in the presence of not only the above-mentioned contact-treatment product; but also an organoaluminum compound, and a second filler having an affinity to a polyolefin which affinity is equal to or higher than that of the first filler, to thereby obtain a composition comprising an ethylene polymer and the first and second fillers.

However, in this method, it is impossible to strongly bond the highly active catalyst component to the filler, so that not only is the catalyst activity low, but also the obtained ethylene polymer has poor powder characteristics. In addition, in this method, the obtained polymer is inevitably caused to contain fillers, irrespective of whether or not it is intended to incorporate the fillers into the polymer.

Unexamined Japanese Patent Application Laid-Open Specification No. 61-31404 (corresponding to DE 3424697.5) discloses a method in which ethylene is homopolymerized or copolymerized with an α-olefin in the presence of a catalyst comprising a mixture of a transition metal compound, and an organoaluminumoxy compound-carrying substance obtained by contacting a water-containing inorganic substance with an organoaluminum compound, such as trialkylaluminum.

However, when a water-containing inorganic substance is contacted with an organoaluminum compound, only the water in the water-containing inorganic substance is reacted with the organoaluminum compound to form a reaction product, which is not chemically bonded to the inorganic substance, so that the formed reaction product cannot be securely carried on the inorganic substance. Further, the reaction between water and the organoaluminum compound is a vigorous exothermic reaction and hence it is very difficult to synthesize only an organoaluminumoxy compound selectively while controlling the molecular weight of the organoaluminumoxy compound to an appropriate level, so that it is difficult to obtain an organoaluminumoxy compound having a molecular weight in the range which is effective for facilitating polymerization. Therefore, this method cannot be effectively put to practical use.

Unexamined Japanese Patent Application Laid-Open Specification No. 4-224808 discloses a method for α-olefin polymerization using a solid catalyst. The solid catalyst is obtained by contacting aluminoxane with an inorganic compound containing water of crystallization or having water adsorbed thereon, to thereby obtain a solid product, and subsequently contacting the obtained solid product with a metallocene compound and, optionally, an organometal compound. Further, Unexamined Japanese Patent Application Laid-Open Specification No. 6-145238 discloses a method for the polymerization of olefins, using a solid catalyst. The solid catalyst is obtained by contacting and reacting aluminoxane with an inorganic oxide containing no water or having adsorbed thereon not more than 10% by weight of water, to thereby obtain a solid auxiliary catalyst comprising the inorganic oxide having the aluminoxane carried thereon, and contacting the obtained solid auxiliary catalyst with a transition metal compound and an organoalkylaluminum compound to prepare a solid catalyst, which is used immediately upon preparation thereof.

However, in these methods, the aluminoxane cannot be securely carried on the inorganic solid. When such an aluminoxane-carrying inorganic solid is used as a catalyst, the aluminoxane disadvantageously is caused to separate from the inorganic solid during the polymerization. The separated aluminoxane is reacted with a metallocene compound to form a complex having a polymerization activity, which complex disadvantageously causes formation of a polymer having an indefinite form but not having a desired form, such as a particulate form. As described above, such an indefinite-form polymer is likely to adhere to the inner wall and the like of the polymerizer. Thus, these methods cannot take full advantage of the use of a catalyst carried on a carrier. Therefore, it is difficult to commercially use these methods.

Unexamined Japanese Patent Application Laid-Open Specification Nos. 60-35006, 60-35007 and 60-35008 have a description to the effect that a transition metal compound and an organoaluminumoxy compound may be carried on a carrier, such as silica, alumina or silica-alumina, and the resultant product can be used as a catalyst. Unexamined Japanese Patent Application Laid-Open Specification Nos. 61-108610, 61-296008 and 5-155931 disclose a method in which an olefin is polymerized in the presence of a catalyst comprising an inorganic oxide as a carrier and, carried thereon, a transition metal compound, such as zirconocene, and aluminoxane.

However, in any of these methods, the catalyst cannot be securely carried on the carrier. Therefore, during the polymerization, the catalyst disadvantageously is caused to separate from the carrier, and the separated catalyst exhibits in situ a polymerization activity, causing the resultant polymer to be in an indefinite form. The indefinite-form polymer is likely to adhere to the inner wall of the polymerizer, the agitation blades, the baffle plates and the like, thus making it impossible to continuously perform the polymerization on a commercial scale. Unexamined Japanese Patent Application Laid-Open Specification No. 63-280703 (corresponding to EP 0294942) discloses an olefin polymerization catalyst comprising an organometal compound, a particulate carrier, aluminoxane, a compound containing a transition metal selected from the metals of Group 4 of the Periodic Table, and an olefin polymer formed by preliminary polymerization. Further, Unexamined Japanese Patent Application Laid-Open Specification No. 5-155930 discloses a method for the preliminary polymerization of an olefin, using a particulate carrier having water adsorbed thereon and having a hydroxyl group in the surface thereof, each in a specific amount.

These methods have been expected to provide advantages that the preliminary polymerization improves the powder characteristics of the final polymer and that a polymer formed by the preliminary polymerization protects the catalyst containing a transition metal compound and an organoaluminumoxy compound and prevents the catalyst from being deactivated with time. However, although the powder characteristics of the polymer are improved to some extent, the improvement is not satisfactory. In addition, these methods have problems in that, since it is necessary to additionally involve the step of preliminary polymerization, not only is the quality of the final polymer likely to be distributed, but also the production cost of the polymer is high.

As a substituent for an aluminoxane which serves as a promoter for a metallocene catalyst system, Japanese Patent Application prior-to-examination Publication (kohyo) No. 1-502036 (corresponding to WO88/05793) and Japanese Patent Application Laid-Open Specification No. 8-34809

(corresponding to WO94/07927, U.S. Pat. No. 5,599,761 and EP 0 277 004) disclose a bulky, noncoordinating ionic promoter comprising an anion comprising a plurality of lipophilic groups covalently coordinating with and shielding a central, formal charge-bearing metal or metalloid atom. In these prior art documents, it is described that this ionic promoter is advantageous not only in that it has high polymerization activity, but also in that it can exhibit excellent copolymerizability. However, the anion of the above ionic promoter does not contain a reactive substituent, such as an alkyl group contained in an aluminoxane wherein the alkyl group can directly react with a hydroxyl group on the surface of a carrier, e.g., a silica. Hence, the above ionic promoter cannot form a chemical bond with a carrier, so that it is difficult to securely support the ionic promoter on a carrier. For supporting the ionic promoter on a carrier, it is necessary to use a method described in WO91/09882, i.e., a method which comprises subjecting a carrier to dehydration, treating the dehydrated carrier with an alkylaluminum solution to obtain an inert carrier, and physically adsorbing an ionic promoter onto the obtained inert carrier. However, by such a method, the ionic promoter cannot be securely supported on the carrier, so that, during the polymerization, the occurrence of adherence of a polymer scale to inside surfaces associated with a polymerizer cannot be prevented.

Japanese Patent Application prior-to-examination Publication (kohyo) No. 7-501573 (corresponding to WO93/11172 and U.S. Pat. No. 5,427,991) discloses a promoter which comprises a polyanionic moiety comprising a plurality of metal or metalloid atom-containing noncoordinating anionic groups which are pendant from and chemically bonded to a core component of the catalyst system. Further, WO96/28480 discloses a method in which a promoter comprising a compatible anion having a substituent containing at least one active hydrogen moiety is provided, and the promoter is caused to be supported on a carrier which has been treated with an organometal compound. The object of the techniques of the above prior art documents is to securely support a promoter on a carrier by forming a chemical bond therebetween. By using the techniques of the above prior art documents, the occurrence of adherence of a polymer scale to inside surfaces associated with a polymerizer can be prevented to some extent. However, these techniques have a defect in that, when a promoter is chemically bonded to a carrier, the chemical properties of the promoter are inevitably changed, so that the catalytic activity of the promoter supported on the carrier becomes disadvantageously low, as compared to that expected before being supported on the carrier.

As described hereinabove, the prior art techniques have problems in that it is impossible to produce an olefin polymer having excellent powder characteristics by suspension polymerization (slurry polymerization) or gaseous phase polymerization, while achieving high polymerization activity and preventing the occurrence of adherence of the polymer to the inner wall, the agitation blades and the like associated with a polymerizer.

Therefore, it has been desired to develop a novel catalyst which not only has high polymerization activity, but also enables commercial production of an olefin polymer having excellent powder characteristics, while preventing the occurrence of adherence of the polymer to the inner wall, the agitation blades and the like associated with a polymerizer.

SUMMARY OF THE INVENTION

In this situation, the present inventors have conducted extensive and intensive studies with a view toward solving the above-mentioned problems accompanying the prior art. As a result, it has unexpectedly been found that an olefin polymerization catalyst obtained by contacting several specific components is advantageous not only in that it has high polymerization activity, but also in that an olefin polymer having excellent powder characteristics can be produced by suspension polymerization (slurry polymerization) or gaseous phase polymerization, while preventing unfavorable phenomena, such as the occurrence of adherence of the polymer to various inside surfaces associated with a polymerizer. More specifically, the present inventors have unexpectedly found that the problems accompanying the prior art can be solved by the use of an olefin polymerization catalyst comprising: (A) a transition metal compound comprising a transition metal having η-bonded thereto a cyclic anionic ligand; (B) a mixture of (B-1) an activator compound and (B-2) a specific organometal compound containing an element selected from elements of Groups 1 to 15 of the Periodic Table, the activator compound (B-1) comprising a cation and a noncoordinating, compatible anion and being capable of reacting with the transition metal compound (A) to form a metal complex having a catalytic activity; (C) a solid component having substantially no hydroxyl group; and optionally (D) an organoaluminum compound, wherein the catalyst is obtained by contacting components (A) to (C) and optionally component (D). By the use of such a catalyst, in which a catalytically active species formed by the reaction between components (A) and (B-1) is very securely supported on carrier component (C) due to the action of component (B-2) not by chemical bonding, but by physical adsorption, to thereby prevent a separation of the catalyst active species from the carrier component, an olefin polymer having excellent powder characteristics can be efficiently produced by a continuous operation of a commercial scale plant, while preventing unfavorable phenomena, such as the occurrence of adherence of the polymer to various inside surfaces associated with a polymerizer. The present invention has been completed, based on the above novel finding. Accordingly, it is an object of the present invention to provide an olefin polymerization catalyst, especially an ethylene polymerization catalyst, which is advantageous in that it not only has high polymerization activity, but is also capable of producing an olefin polymer having excellent powder characteristics by suspension polymerization (slurry polymerization) or gaseous phase polymerization, while preventing unfavorable phenomena, such as the occurrence of adherence of the polymer to various inside surfaces associated with the polymerizer, thereby enabling an olefin polymer having excellent powder characteristics to be efficiently produced by a continuous operation of a commercial scale plant.

It is another object of the present invention to provide a method for effectively and efficiently producing an ethylene homopolymer or an ethylene copolymer in the presence of the catalyst of the present invention.

The foregoing and other objects, features and advantages of the present invention will be apparent to those skilled in the art from the following detailed description taken in connection with the appended claims.

DETAILED DESCRIPTION OF THE INVENTION

In one aspect of the present invention, there is provided an olefin polymerization catalyst comprising:

(A) a transition metal compound comprising a transition metal having η-bonded thereto a cyclic anionic ligand;

(B) a mixture of:
(B-1) an activator compound which is present in an amount 0.5 to 10 times the molar amount of the transition metal compound (A), and
(B-2) an organometal compound which is present in an amount 0.05 to 20 times the molar amount of the activator compound (B-1), the activator compound (B-1) comprising a cation and a non-coordinating, compatible anion, the activator compound (B-1) being capable of reacting with the transition metal compound (A) to form a metal complex having a catalytic activity, the organometal compound (B-2) being represented by the following formula (1):

wherein:
M represents an element selected from the group consisting of elements of Groups 1 to 15 of the Periodic Table,
R each occurrence independently represents a $C_1$–$C_{12}$ linear, branched or cyclic alkyl group or a $C_6$–$C_{20}$ aryl group,
X each occurrence independently represents a halide, a hydride or a $C_1$–$C_{10}$ alkoxide group,
m represents a formal oxidation state of M, and
n is an integer of from 1 to m, wherein m is as defined above;

(C) a solid component having substantially no hydroxyl group; and optionally
(D) an organoaluminum compound,
the catalyst being obtained by contacting the components (A) to (C) and optionally the component (D).

In another aspect of the present invention, there is provided a method for producing an ethylene homopolymer or an ethylene copolymer, which comprises homopolymerizing ethylene or copolymerizing ethylene with at least one comonomer selected from the group consisting of an α-olefin represented by the formula $H_2C=CHR$ wherein R is a methyl group, an ethyl group, a $C_3$–$C_{18}$ linear, branched or cyclic alkyl group or a $C_6$–$C_{20}$ aryl group, a $C_3$–$C_{20}$ cyclic olefin, and a $C_4$–$C_{20}$ linear, branched or cyclic diene, in the presence of the above-mentioned catalyst.

For an easy understanding of the present invention, the essential features and various preferred embodiments of the present invention are enumerated below.

1. An olefin polymerization catalyst comprising:
(A) a transition metal compound comprising a transition metal having η-bonded thereto a cyclic anionic ligand;
(B) a mixture of:
(B-1) an activator compound which is present in an amount 0.5 to 10 times the molar amount of the transition metal compound (A), and
(B-2) an organometal compound which is present in an amount 0.05 to 20 times the molar amount of the activator compound (B-1), the activator compound (B-1) comprising a cation and a noncoordinating, compatible anion, the activator compound (B-1) being capable of reacting with the transition metal compound (A) to form a metal complex having a catalytic activity, the organometal compound (B-2) being represented by the following formula (1):

wherein:
M represents an element selected from the group consisting of elements of Groups 1 to 15 of the Periodic Table,
R each occurrence independently represents a $C_1$–$C_{12}$ linear, branched or cyclic alkyl group or a $C_6$–$C_{20}$ aryl group,
X each occurrence independently represents a halide, a hydride or a $C_1$–$C_{10}$ alkoxide group,
m represents a formal oxidation state of M, and
n is an integer of from 1 to m, wherein m is as defined above;

(C) a solid component having substantially no hydroxyl group; and optionally
(D) an organoaluminum compound,
the catalyst being obtained by contacting the components (A) to (C) and optionally the component (D).

2. The catalyst according to item 1 above, wherein the transition metal compound (A) is represented by the following formula (2):

wherein:
L each occurrence independently represents a η-bonded, cyclic anionic ligand selected from the group consisting of a cyclopentadienyl group, an indenyl group, a tetrahydroindenyl group, a fluorenyl group, a tetrahydrofluorenyl group and an octahydrofluorenyl group, wherein the η-bonded, cyclic anionic ligand optionally has 1 to 8 substituents, each of which independently has up to 20 non-hydrogen atoms and is independently selected from the group consisting of a $C_1$–$C_{20}$ hydrocarbon group, a halogen, a $C_1$–$C_{12}$ halogen-substituted hydrocarbon group, a $C_1$–$C_{12}$ aminohydrocarbyl group, a $C_1$–$C_{12}$ hydrocarbyloxy group, a $C_1$–$C_{12}$ dihydrocarbylamino group, a $C_1$–$C_{12}$ hydrocarbylphosphino group, a silyl group, an aminosilyl group, a $C_1$–$C_{12}$ hydrocarbyloxysilyl group and a halosilyl group;
M represents a transition metal selected from transition metals of Group 4 of the Periodic Table, each independently having a formal oxidation state of +2, +3 or +4, the transition metal being bonded, in a $η^5$ bonding mode, to at least one L;
W represents a divalent substituent having up to 50 non-hydrogen atoms, which has one valence bonded to L and one valence bonded to M, so that W, L and M together form a metallocycle;
X each occurrence independently represents a ligand having up to 60 non-hydrogen atoms, which is a monovalent σ-bonded anionic ligand, a divalent σ-bonded anionic ligand having both valences bonded to M, or a divalent σ-bonded anionic ligand having one valence bonded to M and one valence bonded to L;
X' each occurrence independently represents a neutral Lewis base ligating compound having up to 40 non-hydrogen atoms;
j is 1 or 2, with the proviso that, when j is 2, two L ligands are optionally bonded together through a divalent group having up to 20 non-hydrogen atoms, which is selected from the group consisting of a $C_1$–$C_{12}$ hydrocarbadiyl group, a $C_1$–$C_{12}$ halohydrocarbadiyl group, a $C_1$–$C_{12}$ hydrocarbyleneoxy group, a $c_1$–$C_{12}$ hydrocarbyleneamino group, a silanediyl group, a halosilasdiyl group and a silyleneamino group;

k is 0 or 1;

p is 0, 1 or 2, with the proviso that, when X is a monovalent σ-bonded anionic ligand or a divalent σ-bonded anionic ligand having one valence bonded to M and one valence bonded to L, p is an integer which is one or more smaller than the formal oxidation state of M, and that, when X is a divalent σ-bonded anionic ligand having both valences bonded to M, p is an integer which is (j+1) or more smaller than the formal oxidation state of M; and q is 0, 1 or 2.

3. The catalyst according to item 1 above, wherein the transition metal compound (A) is represented by the following formula (3):

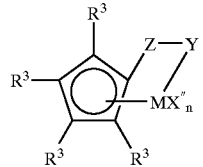

(3)

wherein:
M represents a transition metal selected from the group consisting of titanium, zirconium and hafnium, each independently having a formal oxidation state of +2, +3 or +4;

$R^3$ each occurrence independently represents a substituent having up to 20 non-hydrogen atoms, which is selected from the group consisting of hydrogen, a $C_1$–$C_8$ hydrocarbon group, a silyl group, a germyl group, a cyano group, a halogen and combinations thereof, with the proviso that, when the $R^3$ substituent is a $C_1$–$C_8$ hydrocarbon group, a silyl group or a germyl group, two adjacent $R^3$ substituents are optionally bonded together to form a divalent group, thereby forming a ring in cooperation with a bond between two carbon atoms on the cyclopentadienyl ring which are bonded to the two adjacent $R^3$ substituents, respectively;

X" each occurrence independently represents a substituent having up to 20 non-hydrogen atoms, which is selected from the group consisting of a halide, a $C_1$–$C_{20}$ hydrocarbon group, a $C_1$–$C_{1-8}$ hydrocarbyloxy group, a $C_1$–$C_{1-8}$ hydrocarbylamino group, a silyl group, a $C_1$–$C_{18}$ hydrocarbylamido group, a $C_1$–$C_{18}$ hydrocarbylphosphido group, a $C_1$-$C_{1-8}$ hydrocarbylsulfido group and combinations thereof, with the proviso that two X" substituents optionally together form a neutral $C_4$–$C_{30}$ conjugated diene or optionally together form a divalent group;

Y represents —O—, —S—, —NR*—or —PR*— wherein R* represents hydrogen, a $C_1$–$C_{12}$ hydrocarbon group, a $C_1$–$C_8$ hydrocarbyloxy group, a silyl group, a $C_1$–$C_8$ halogenated alkyl group, a $C_6$–$C_{20}$ halogenated aryl group or a combination thereof;

Z represents $SiR*_2$, $CR*_2$, $SiR*_2SiR*_2$, $CR*_2CR*_2$, $CR*$=$CR*$, $CR*_2SiR*_2$ or $GeR*_2$ wherein R* is as defined above; and n is 1, 2 or 3.

4. The catalyst according to item 1 above, wherein the transition metal compound (A) is represented by the following formula (4) or (5):

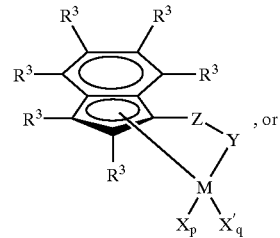

(4)

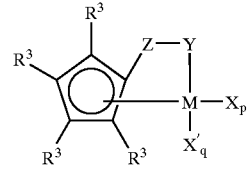

(5)

wherein:
M represents a transition metal selected from the group consisting of titanium, zirconium and hafnium, each independently having a formal oxidation state of +2, +3 or +4;

$R^3$ each occurrence independently represents a substituent having up to 20 non-hydrogen atoms, which is selected from the group consisting of hydrogen, a $C_1$–$C_8$ hydrocarbon group, a silyl group, a germyl group, a cyano group, a halogen and combinations thereof, with the proviso that, when the $R^3$ substituent is a $C_1$–$C_8$ hydrocarbon group, a silyl group or a germyl group, two adjacent $R^3$ substituents are optionally bonded together to form a divalent group, thereby forming a ring in cooperation with a bond between two carbon atoms on the cyclopentadienyl ring which are bonded to the two adjacent $R^3$ substituents, respectively;

X each occurrence independently represents a substituent having up to 20 non-hydrogen atoms, which is selected from the group consisting of a halide, a $C_1$–$C_{20}$ hydrocarbon group, a $C_1$–$C_{12}$ hydrocarbyloxy group, a $C_2$–$C_{12}$ di(hydrocarbyl)amido group, a $C_2$–$C_{12}$ di(hydrocarbyl)phosphido group, a $C_1$–$C_{12}$ hydrocarbylsulfido group, a silyl group and combinations thereof, or represents a stabilizing anionic ligand selected from the group consisting of an allyl group, a 2-(N,N-dimethylaminomethyl)phenyl group and a 2-(N,N-dimethylamino)benzyl group, or represents a divalent group derived from a $C_4$–$C_{30}$ conjugated diene, with the proviso that X and M optionally together form a metallocyclopentene group;

X' each occurrence independently represents a neutral conjugated or non-conjugated diene having up to 40 carbon atoms, which is unsubstituted or substituted with at least one $C_1$–$C_{12}$ hydrocarbon group and which forms a η-complex in cooperation with M;

Y represents —O—, —S—, —NR*— or —PR*— wherein R* represents a hydrogen, a $C_1$–$C_{12}$ hydrocarbon group, a $C_1$–$C_8$ hydrocarbyloxy group, a silyl group, a $C_1$–$C_8$ halogenated alkyl group, a $C_6$–$C_{20}$ halogenated aryl group or a combination thereof;

Z represents $SiR*_2$, $CR*_2$, $SiR*_2SiR*_2$, $CR*_2CR*_2$, $CR*$=$CR*$, $CR*_2SiR*_2$ or $GeR*_2$ wherein R* is as defined above;

p is 0, 1 or 2; and q is 0 or 1, with the proviso:
that, when p is 2 and q is 0, the formal oxidation state of M is +4 and x each occurrence independently represents a substituent having up to 20 non-hydrogen atoms, which is selected from the group consisting of a halide, a $C_1$–$C_{20}$ hydrocarbon group, a $C_1$–$C_{12}$ hydrocarbyloxy group, a $C_2$–$C_{12}$ di(hydrocarbyl)amido group, a $C_2$–$C_{12}$ di(hydrocarbyl)phosphido group, a $C_1$–$C_{12}$ hydrocarbylsulfido group, a silyl group and combinations thereof;

that, when p is 1 and q is 0, the formal oxidation state of M is +3 and X represents a stabilizing anionic ligand selected from the group consisting of an allyl group, a 2-(N,N-dimethylaminomethyl)-phenyl group and a 2-(N,N-dimethylamino)-benzyl group, or the formal oxidation state of M is +4 and X represents a divalent group derived from a $C_4$–$C_{30}$ conjugated diene or X and M together form a metallocyclopentene group; and that, when p is 0 and q is 1, the formal oxidation state of M is +2 and X' represents a neutral conjugated or non-conjugated diene having up to 40 carbon atoms, which is unsubstituted or substituted with at least one $C_1$–$C_{12}$ hydrocarbon group and which forms a η-complex in cooperation with M.

5. The catalyst according to item 1 above, wherein the transition metal compound (A) is represented by the following formula (6):

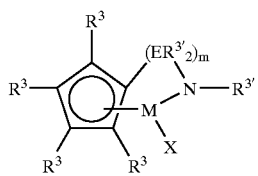
(6)

wherein:
M represents titanium;
X represents a s-trans diene selected from the group consisting of s-trans-$\eta^4$-1,4-diphenyl-1,3-butadiene, s-trans-$\eta^4$-3-methyl-1,3-pentadiene, s-trans-$\eta^4$-1,4-dibenzyl-1,3-butadiene, s-trans-$\eta^4$-2,4-hexadiene, s-trans-$\eta^4$-1,3-pentadiene, s-trans-$\eta^4$-1,4-ditolyl-1,3-butadiene and s-trans-$\eta^4$-1,4-bis(trimethylsilyl)-1,3-butadiene, or represents a s-cis diene which forms a η-complex with M and which is selected from the group consisting of s-cis-$\eta$4-1,4-diphenyl-1,3-butadiene, s-cis-$\eta^4$-3-methyl-1,3-pentadiene, s-cis-$\eta^4$-1,4-dibenzyl-1,3-butadiene, s-cis-$\eta^4$-2,4-hexadiene, s-cis-$\eta^4$-1,3-pentadiene, s-cis-$\eta^4$-1,4-ditolyl-1,3-butadiene and s-cis-$\eta^4$-1,4-bis(trimethylsilyl)-1,3-butadiene;
$R^3$ each occurrence independently represents a substituent selected from the group consisting of hydrogen, a $C_1$–$C_{10}$ hydrocarbon group, a silyl group and combinations thereof, with the proviso that, when the $R^3$ substituent is a $C_1$–$C_{10}$ hydrocarbon group or a silyl group, two adjacent $R^3$ substituents are optionally bonded together to form a divalent group, thereby forming a ring in cooperation with a bond between two carbon atoms on the cyclopentadienyl ring which are bonded to the two adjacent $R^3$ substituents, respectively;
$R^{3'}$ represents a $C_1$–$C_{10}$ hydrocarbyl group;
$R^{3''}$ each occurrence independently represents hydrogen or a $C_1$–$C_{10}$ hydrocarbyl group;

E each occurrence independently represents silicon or carbon; and
m is 1 or 2.

6. The catalyst according to any one of items 1 to 5 above, wherein the activator compound (B-1) is represented by the following formula (7):

wherein:
[L-H]$^{d+}$ represents a proton-donating Brønsted acid, wherein
L represents a neutral Lewis base, and
d is an integer of from 1 to 7; and
[M$^m$+Q$_p$]$^{d-}$ represents a noncoordinating, compatible anion,
wherein
M represents a metal or metalloid of a Group selected from Groups 5 to 15 of the Periodic Table,
Q each occurrence is independently selected from the group consisting of a hydride, a halide, a $C_2$–$C_{20}$ dihydrocarbylamido group, a $C_1$–$C_{30}$ hydrocarbyloxy group, a $C_1$–$C_{30}$ hydrocarbon group and a $C_1$–$C_{40}$ substituted hydrocarbon group, wherein in not more than one occurrence is Q a halide,
m is an integer of from 1 to 7,
p is an integer of from 2 to 14,
d is as defined above, and
p−m=d.

7. The catalyst according to any one of items 1 to 5 above, wherein the activator compound (B-1) is represented by the following formula (8):

wherein:
[L-H]$^{d+}$ represents a proton-donating Brønsted acid, wherein
L represents a neutral Lewis base, and
d is an integer of from 1 to 7; and
[M$^m$+Q$_n${G$_q$(T-H)$_r$}$_z$]$^{d-}$ represents a non-coordinating, compatible anion,
wherein
M represents a metal or metalloid of a Group selected from Groups 5 to 15 of the Periodic Table,
Q each occurrence is independently selected from the group consisting of a hydride, a halide, a $C_2$–$C_{20}$ dialkylamido group, a $C_1$–$C_{20}$ alkoxide group, a $C_6$–$C_{30}$ aryloxide group, a $C_1$–$C_{30}$ hydrocarbon group, a $C_1$–$C_{40}$ halo-substituted hydrocarbon group and a $C_1$–$C_{40}$ hydrocarbyl- or $C_1$–$C_{40}$ halohydrocarbyl-substituted organometalloid group, wherein in not more than one occurrence is Q a halide,
G each occurrence independently represents a $C_1$–$C_{30}$ multivalent hydrocarbon group having a valence of (r+1),
T represents —O—, —S—, —NR— or —PR— wherein R represents hydrogen, a $C_1$–$C_{12}$ hydrocarbyl group, a $C_1$–$C_8$ trihydrocarbylsilyl group or a $C_1$–$C_8$ trihydrocarbylgermanium group,
m is an integer of from 1 to 7,
n is an integer of from 0 to 7,
q is 0 or 1,
r is an integer of from 1 to 3,
z is an integer of from 1 to 8,
d is as defined above, and n+z−m=d.

8. The catalyst according to any one of items 1 to 5 above, wherein the activator compound (B-1) is represented by the following formula (9):

$$[L-H]^+[BQ_3Q']^- \qquad (9)$$

wherein:
[L-H]$^+$ represents a proton-donating Brønsted acid, wherein
L represents a neutral Lewis base containing carbon, nitrogen, phosphorus or sulfur; and
[BQ$_3$Q']$^-$ represents a noncoordinating, compatible anion,
wherein
Q each occurrence independently represents a C$_6$–C$_{20}$ aryl group which is unsubstituted or substituted with at least one substituent selected from the group consisting of a C$_1$–C$_{12}$ hydrocarbon group and a halogen, and
Q' represents a C$_6$–C$_{20}$ aryl group substituted with a hydroxyl group.

9. The catalyst according to any one of items 1 to 8 above, wherein:
M in formula (1) represents an element selected from the group consisting of elements of Groups 2 and 13 to 15 of the Periodic Table; and
R, X, m and n in formula (1) are as defined above for formula (1).

10. The catalyst according to any one of items 1 to 8 above, wherein the organometal compound (B-2) is represented by the following formula (10):

$$AlR_nX_{3-n} \qquad (10)$$

wherein
R each occurrence independently represents a C$_1$–C$_{12}$ linear, branched or cyclic alkyl group or a C$_6$–C$_{20}$ aryl group;
X each occurrence independently represents a halide, a hydride or a C$_1$–C$_{10}$ alkoxide group; and
n is 1, 2 or 3.

11. The catalyst according to any one of items 1 to 10 above, wherein the solid component (C) is at least one substance selected from the group consisting of silica, alumina, magnesia, magnesium chloride, zirconia, titania, boron oxide, calcium oxide, zinc oxide, barium oxide, vanadium(V) oxide, chromium oxide, thorium oxide, mixtures thereof and oxide complexes thereof, each having substantially no hydroxyl group.

12. The catalyst according to any one of items 1 to 11 above, wherein the solid component (C) is a treated silica having substantially no hydroxyl group, which has been obtained by a method comprising: subjecting a silica to heat treatment at a temperature of 150° C. or more to thereby obtain a pretreated silica having hydroxyl groups on the surface thereof in an amount of from 0.05 to 10 mmol per gram of the silica; and treating the pretreated silica with an organometal compound which is used in an amount 1 to 5 times the molar amount of the hydroxyl groups on the surface of the pretreated silica.

13. The catalyst according to any one of items 1 to 12 above, wherein the optional organoaluminum compound (D) of the catalyst is represented by the following formula (10):

$$AlR_nX_{3-n} \qquad 910)$$

wherein
R each occurrence independently represents a C$_1$–C$_{12}$ linear, branched or cyclic alkyl group or a C$_6$–C$_{20}$ aryl group;
X each occurrence independently represents a halide, a hydride or a C$_1$–C$_{10}$ alkoxide group; and
n is 1, 2 or 3.

14. The catalyst according to any one of items 1 to 13 above, which is produced by a method comprising the steps of:
(i) intimately mixing and contacting the activator compound (B-1) and the organometal compound (B-2) with each other to form the component (B),
(ii) intimately mixing and contacting the component (B) and the solid component (C) with each other, to thereby obtain a mixture of the components (B) and (C), and
(iii) intimately mixing and contacting the transition metal compound (A) and the mixture of the components (B) and (C) with each other,
wherein at least one member selected from the group consisting of the component (A) used in the step (iii) and the component (C) used in the step (ii) is optionally in the form of a mixture thereof with the component (D), and the component (D) is optionally added to the mixture which is obtained in the step (ii) before the step (iii).

15. A method for producing an ethylene homopolymer or an ethylene copolymer, which comprises homopolymerizing ethylene or copolymerizing ethylene with at least one comonomer selected from the group consisting of an α-olefin represented by the formula H$_2$C=CHR wherein R is a methyl group, an ethyl group, a C$_3$–C$_{18}$ linear, branched or cyclic alkyl group or a C$_6$–C$_{20}$ aryl group, a C$_3$–C$_{20}$ cyclic olefin, and a C$_4$–C$_{20}$ linear, branched or cyclic diene, in the presence of the catalyst of item 1.

The reference character(s) and suffix(es), which are used in various formulae described herein, are, respectively, used to designate specific element(s), specific substituent(s) or the like and specific number(s) or the like, only in connection with a certain formula in which the reference character(s) and suffix(es) are used, and, therefore, the same reference character(s) and suffix(es) used in different formulae do not always designate the same element(s), substituent(s) or the like and the same number(s) or the like, respectively.

The periodic Table referred to herein is the Periodic Table published and copyrighted by CRC Press, Inc., 1989. The "Group" and "Groups" used herein are in accordance with the above-mentioned Periodic Table and the IUPAC system for numbering groups.

The term "hydrocarbyl group" as employed herein means any aliphatic, cycloaliphatic, aromatic group or any combination thereof.

The term "hydrocarbyloxy group" employed herein means a hydrocarbyl group having oxygen, which is bonded, through an oxygen linkage, to a metal atom, a metalloid, or a carbon, nitrogen or phosphorus atom of a compound.

The term "silyl group" employed herein means a silicon-containing group bonded, through a silicon linkage, to a metal atom, a metalloid, or a carbon, nitrogen or phosphorus atom of a compound.

The term "germyl group" employed herein means a germanium-containing group bonded, through a germanium linkage, to a metal atom, a metalloid, or a carbon, nitrogen or phosphorus atom of a compound.

The olefin polymerization catalyst of the present invention comprises:

(A) a transition metal compound comprising a transition metal having η-bonded thereto a cyclic anionic ligand;
(B) a mixture of (B-1) an activator compound and (B-2) an organometal compound;
(C) a solid component; and optionally
(D) an organoaluminum compound.

Hereinbelow, explanation is made with respect to transition metal compound (A) comprising a transition metal having η-bonded thereto a cyclic anionic ligand [hereinafter, frequently referred to simply as "component (A)"].

As an example of component (A) used in the present invention, there can be mentioned a compound represented by the following formula (2):

  (2)

wherein:
L each occurrence independently represents a η-bonded, cyclic anionic ligand selected from the group consisting of a cyclopentadienyl group, an indenyl group, a tetrahydroindenyl group, a fluorenyl group, a tetrahydrofluorenyl group and an octahydrofluorenyl group, wherein the η-bonded, cyclic anionic ligand optionally has 1 to 8 substituents, each of which independently has up to 20 non-hydrogen atoms and is independently selected from the group consisting of a $C_1$–$C_{20}$ hydrocarbon group, a halide, a $C_1$–$C_{12}$ halogen-substituted hydrocarbon group, a $C_1$–$C_{12}$ aminohydrocarbyl group, a $C_1$–$C_{12}$ hydrocarbyloxy group, a $C_1$–$C_{12}$ dihydrocarbylamino group, a $C_1$–$C_{12}$ hydrocarbylphosphino group, a silyl group, an aminosilyl group, a $C_1$–$C_{12}$ hydrocarbyloxysilyl group and a halosilyl group;
M represents a transition metal selected from transition metals of Group 4 of the Periodic Table, each independently having a formal oxidation state of +2, +3 or +4, the transition metal being bonded, in a $η^5$ bonding mode, to at least one L;
W represents a divalent substituent having up to 50 non-hydrogen atoms, which has one valence bonded to L and one valence bonded to M, so that W, L and M together form a metallocycle;
X each occurrence independently represents a ligand having up to 60 non-hydrogen atoms, which is a monovalent aσ-bonded anionic ligand having both valences bonded to M, or a divalent σ-bonded anionic ligand having one valence bonded to M and one valence bonded to L;
X' each occurrence independently represents a neutral Lewis base ligating compound having up to 40 non-hydrocarbon atoms;
j is 1 or 2, with the proviso that, when j is 2, two L ligands are optionally bonded together through a divalent group having up to 20 non-hydrogen atoms, which is selected from the group consisting of a $C_1$–$C_{20}$ hydrocarbadiyl group, a $C_1$–$C_{12}$ halohydrocarbadiyl group, a $C_1$–$C_{12}$ hydrocarbyleneoxy group, a $C_1$–$C_{12}$ hydrocarbyleneamino group, a silandiyl group, a halolsilenediyl group and an aminosilane;
k is 0 or 1;
p is 0, 1 or 2, with the proviso that when X is a monovalent σ-bonded anionic ligand or a divalent σ-bonded anionic ligand bonded having one valence bonded to M and one valence bonded to L, p is an integer which is one or more smaller than the formal oxidation state of M, and that, when X is a divalent σ-bonded anionic ligand having both valences bonded to M, p is an integer which is (j+1) or more smaller than the formal oxidation state of M; and
q is 0, 1 or 2.

Examples of X ligands used in the compound of formula (2) above include a halide, a $C_1$–$C_{60}$ hydrocarbon group, a $C_1$–$C_{60}$ hydrocarbyloxy group, a $C_1$–$C_{60}$ hydrocarbylamido group, a $C_1$–$C_{60}$ hydrocarbylphosphido group, a $C_1$–$C_{60}$ hydrocarbylsulfido group, silyl group and combinations thereof.

Examples of X' neutral Lewis base ligating compounds used in the compound of formula (2) above include phosphines, ethers, amines, $C_2$–$C_{40}$ olefins, $C_1$–$C_{40}$ dienes and divalent groups derived from these compounds.

In the present invention, it is preferred that component (A) is a transition metal compound represented by formula (2) above wherein J is 1.

Preferred examples of compounds of formula (2) above wherein j is 1 include a compound represented by the following formula (3):

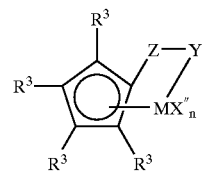  (3)

wherein:
M represents a transition metal selected from the group consisting of titanium, zirconium and hafnium, each independently having a formal oxidation state of +2, +3 or +4;
$R^3$ each occurrence independently represents a substituent having up to 20 non-hydrogen atoms, which is selected from the group consisting of hydrogen, a $C_1$–$C_8$ hydrocarbon group, a silyl group, a germyl group, a cyano group, a halogen and combinations thereof, with the proviso that, when substituent $R^3$ is a $C_1$–$C_8$ hydrocarbon group, a silyl group or a germyl group, two adjacent $R^3$ substituents are optionally bonded together to form a divalent group, thereby forming a ring in cooperation with a bond between two carbon atoms on the cyclopentadienyl ring which are bonded to the two adjacent $R^3$ substituents, respectively;
X" each occurrence independently represents a substituent having up to 20 non-hydrogen atoms, which is selected from the group consisting of a halide, a $C_1$–$C_{20}$ hydrocarbon group, a $C_1$–$C_{18}$ hydrocarbyloxy group, a $C_1$–$C_{18}$ hydrocarbylamino group, a silyl group, a $C_1$-$C_{18}$ hydrocarbylamido group, a $C_1$–$C_{18}$ hydrocarbylphosphido group, a $C_1$–$C_{18}$ hydrocarbylsulfido group and combinations thereof, with the proviso that two X" substituents optionally together form a neutral $C_4$–$C_{30}$ conjugated diene or optionally together form a divalent group;
Y represents —O—, —S—, —NR*— or —PR*— wherein R* represents hydrogen, a $C_1$–$C_{12}$ hydrocarbon group, a $C_1$–$C_8$ hydrocarbyloxy group, a silyl group, a $C_1$–$C_8$ hologenated alkyl group, a $C_6$–$C_{20}$ hologenated aryl group or a combination thereof;
Z represents $SiR^*_2$, $CR^*_2$, $SiR^*_2SiR^*_2$, $CR^*_2CR^*_2$, $CR^*{=}CR^*$, $CR^*_2SiR^*_2$ or $GeR^*_2$ wherein R* is as defined above; and
n is 1, 2 or 3.

More preferred examples of compounds of formula (2) above wherein j is 1 include a compound represented by the following formula (4) or (5):

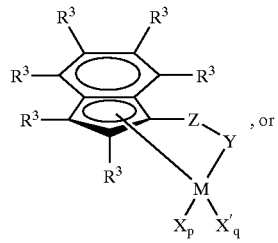
(4)

, or

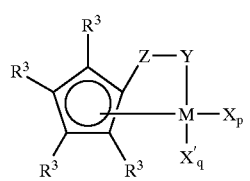
(5)

wherein:
M represents a transition metal selected from the group consisting of titanium, zirconium and hafnium, each independently having a formal oxidation state of +2, +3 or +4.

$R^3$ each occurrence independently represents a substituent having up to 20 non-hydrogen atoms, which is selected from the group consisting of hydrogen, a $C_1$–$C_8$ hydrocarbon group, a silyl group, a germyl group, a cyano group, a halogen and combinations thereof, with the proviso that, when the $R^3$ substituent is a $C_1$–$C_8$ hydrocarbon group, a silyl group or a germyl group, two adjacent $R^3$ substituents are optionally bonded together to form a divalent group, thereby forming a ring in cooperation with a bond between two carbon atoms on the cyclopentadienyl ring which are bonded to the two adjacent $R^3$ substituents, respectively;

X each occurrence independently represents a substituent having up to 20 non-hydrogen atoms, which is selected from the group consisting of a halide, a $C_1$–$C_{20}$ hydrocarbon group, a $C_1$–$C_{12}$ hydrocarbyloxy group, a $C_2$–$C_{12}$ di(hydrocarbyl)amido group, a $C_2$–$C_{12}$ di(hydrocarbyl)phosphido group, a $C_1$–$C_{12}$ hydrocarbylsulfido group, a silyl group and combinations thereof, or represents a stabilizing anionic ligand selected from the group consisting of an allyl group, a 2-(N,N-dimethylaminomethyl)phenyl group and a 2-(N,N-dimethylamino)benzyl group, or represents a divalent group derived from a $C_4$–$C_{30}$ conjugated diene, with the proviso that X and M optionally together form a metallocyclopentene group;

X' each occurrence independently represents a neutral conjugated or non-conjugated diene having up to 40 carbon atoms, which is unsubstituted or substituted with at least one $C_1$–$C_{12}$ hydrocarbon group and which forms a η-complex in cooperation with M;

Y represents —O—, —S—, —NR*— or —PR*— wherein R* represents a hydrogen, a $C_1$–$C_{12}$ hydrocarbon group, a $C_1$–$C_8$ hydrocarbyloxy group, a silyl group, a $C_1$–$C_8$ halogenated alkyl group, a $C_6$–$C_{20}$ halogenated aryl group or a combination thereof;

Z represents $SiR*_2$, $CR*_2$, $SiR*_2SiR*_2$, $CR*_2CR*_2$, $CR*=CR*$, $CR*_2SiR*_2$ or $GeR*_2$ wherein R* is as defined above;

p is 0, 1 or 2; and
q is 0 or 1,
with the proviso:
that, when p is 2 and q is 0, the formal oxidation state of M is +4 and X each occurrence independently represents a substituent having up to 20 non-hydrogen atoms, which is selected from the group consisting of a halide, a $C_1$–$C_{20}$ hydrocarbon group, a $C_1$–$C_{12}$ hydrocarbyloxy group, a $C_2$–$C_{12}$ di(hydrocarbyl)amido group, a $C_2$–$C_{12}$ di(hydrocarbyl)phosphido group, a $C_1$–$C_{12}$ hydrocarbylsulfido group, a silyl group and combinations thereof;

that, when p is 1 and q is 0, the formal oxidation state of M is +3 and X represents a stabilizing anionic ligand selected from the group consisting of an allyl group, a 2-(N,N-dimethylaminomethyl)phenyl group and a 2-(N,N-dimethylamino)benzyl group, or the formal oxidation state of M is +4 and X represents a divalent group derived from a $C_4$–$C_{30}$ conjugated diene or X and M together form a metallocyclopentene group; and that, when p is 0 and q is 1, the formal oxidation state of M is +2 and X' represents a neutral conjugated or non-conjugated diene having up to 40 carbon atoms, which is unsubstituted or substituted with at least one $C_1$–$C_{12}$ hydrocarbon group and which forms a η-complex in cooperation with M.

Most preferred examples of compounds of formula (2) above wherein j is 1 include a compound represented by the following formula (6):

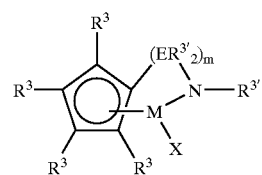
(6)

wherein:
M represents titanium;
X represents a s-trans diene selected from the group consisting of s-trans-$\eta^4$-1,4-diphenyl-1,3-butadiene, s-trans-$\eta^4$-3-methyl-1,3-pentadiene, s-trans-$\eta^4$-1,4-dibenzyl-1,3-butadiene, s-trans-$\eta^4$-2,4-hexadiene, s-trans-$\eta^4$-1,3-pentadiene, s-trans-$\eta^4$-1,4-ditolyl-1,3-butadiene and s-trans-$\eta^4$-1,4-bis(trimethylsilyl)-1,3-butadiene, or represents a s-cis diene which forms a η-complex with M and which is selected from the group consisting of s-cis-$\eta^4$-1,4-diphenyl-1,3-butadiene, s-cis-$\eta^4$-3-methyl-1,3-pentadiene, s-cis-$\eta^4$-1,4-dibenzyl-1,3-butadiene, s-cis-$\eta^4$-2,4-hexadiene, s-cis-$\eta^4$-1,3-pentadiene, s-cis-$\eta^4$-1,4-ditolyl-1,3-butadiene and s-cis-$\eta^4$-1,4-bis(trimethylsilyl)-1,3-butadiene;

$R^3$ each occurrence independently represents a substituent selected from the group consisting of hydrogen, a $C_1$–$C_{10}$ hydrocarbon group, a silyl group and combinations thereof, with the proviso that, when the $R^3$ substituent is a $C_1$–$C_{10}$ hydrocarbon group or a silyl group, two adjacent $R^3$ substituents are optionally bonded together to form a divalent group, thereby forming a ring in cooperation with a bond between two carbon atoms on the cyclopentadienyl ring which are bonded to the two adjacent $R^3$ substituents, respectively;

R³' represents a C₁–C₁₀ hydrocarbyl group;
R³'' each occurrence independently represents hydrogen or a C₁–C₁₀ hydrocarbyl group;
E each occurrence independently represents silicon or carbon; and
m is 1 or 2.

Each of the dienes mentioned above as X has an asymmetrical configuration. Generally, each of the above-mentioned dienes is present in the form of a mixture of geometrical isomers.

Examples of R³' groups in formula (6) above include alkyl groups, such as a methyl group, an ethyl group, a propyl group, a butyl group, a pentyl group, a hexyl group and isomers thereof, a cyclododecyl group, a norbornyl group and benzyl group and a phenyl group.

Examples of ER³'' groups in formula (6) include a dimethyl silanediyl group and an ethanediyl group.

Examples of cyclic delocalized η-bonded group in formula (6) include a cyclopentadienyl group, a tetramethylcyclopentadienyl group, an indenyl group, a tetrahydroindenyl group, a fluorenyl group, a tetrahydrofluorenyl group and an octahydrofluorenyl group.

Specific examples of (A) components used in the present invention include:
[(N-t-butylamido)(tetramethyl-η⁵-cyclopentadienyl)-1,2-ethanediyl]titanium dimethyl,
[(N-t-butylamido)(tetramethyl-η⁵-cyclopentadienyl)dimethylsilane]titanium dimethyl,
[(N-methylamido)(tetramethyl-η⁵-cyclopentadienyl)dimethylsilane]titanium dimethyl,
[(N-phenylamido)(tetramethyl-η⁵-cyclopentadienyl)dimethylsilane]titanium dimethyl,
[(N-benzylamido)(tetramethyl-η⁵-cyclopentadienyl)dimethylsilane]titanium dimethyl,
[(N-t-butylamido)(η⁵-cyclopentadienyl)-1,2-ethanediyl]titanium dimethyl,
[(N-t-butylamido)(η⁵-cyclopentadienyl)dimethylsilane]titanium dimethyl,
[(N-methylamido)(η⁵-cyclopentadienyl)-1,2-ethanediyl]titanium dimethyl,
[(N-methylamido) (η⁵-cyclopentadienyl)dimethylsilane]titanium dimethyl,
[(N-t-butylamido)(η⁵-indenyl)dimethylsilane]titanium dimethyl, and
[(N-benzylamido)(η⁵-indenyl)dimethylsilane]titanium dimethyl.

Further, specific examples of (A) components used in the present invention also include compounds having the same nomenclatures as those of the above-mentioned specific examples of (A) components except that the term "dimethyl", which appears at the rear end of each nomenclature and appears immediately following the term "titanium" and which corresponds to X" in formula (3) above, is replaced by any of the following terms: "dibenzyl", "2-(N,N-dimethylamino)benzyl", "2-butene-1,4-diyl", "s-trans-η⁴-1,4-diphenyl-1,3-butadiene", "s-trans-η⁴-3-methyl-1,3-pentadiene", "s-trans-η⁴-1,4-dibenzyl-1,3-butadiene", "s-trans-η⁴-2,4-hexadiene", "s-trans-η⁴-1,3-pentadiene", "s-trans-η⁴-1,4-ditolyl-1,3-butadiene", "s-trans-η⁴-1,4-bis(trimethylsilyl)-1,3-butadiene", "s-cis-η⁴-1,4-diphenyl-1,3-butadiene", "s-cis-η⁴-3-methyl-1,3-pentadiene", "s-cis-η⁴-1,4-dibenzyl-1,3-butadiene", "s-cis-η⁴-2,4-hexadiene", "s-cis-η⁴-1,3-pentadiene", "s-cis-η⁴-1,4-ditolyl-1,3-butadiene" and "s-cis-η⁴-1,4-bis(trimethylsilyl)-1,3-butadiene".

The transition metal compound (A) used in the present invention can be generally synthesized by a conventional method. As a preferred example of methods for synthesizing the transition metal compound as component (A) used in the present invention, there can be mentioned a method disclosed in U.S. Pat. No. 5,491,246.

Hereinbelow, explanation is made with respect to mixture (B) [hereinafter, frequently referred to as "component (B)"] used in the catalyst of the present invention. Component (B) is a mixture of:

(B-1) an activator compound [hereinafter, frequently referred to as "component (B-1)"] which is present in an amount 0.5 to 10 times the molar amount of transition metal compound (A), and (B-2) an organometal compound [hereinafter, frequently referred to as "component (B-2)"] which is present in an amount 0.05 to 20 times the molar amount of activator compound (B-1), wherein activator compound (B-1) comprises a cation and a noncoordinating, compatible anion, wherein activator compound (B-1) is capable of reacting with transition metal compound (A) to form a metal complex having a catalytic activity, wherein organometal compound (B-2) is represented by the following formula (1):

$$MR_nX_{m-n} \qquad (1)$$

wherein:
M represents an element selected from the group consisting of elements of Groups 1 to 15 of the Periodic Table,
R each occurrence independently represents a C₁–C₁₂ linear, branched or cyclic alkyl group or a C₆–C₂₀ aryl group,
X each occurrence independently represents a halide, a hydride or a C₁–C₁₀ alkoxide group,
m represents a formal oxidation state of M, and
n is an integer of from 1 to m, wherein m is as defined above.

In the catalyst of the present invention, a metal complex is formed by the reaction between components (A) and (B-1), and the metal complex serves as an active species of the catalyst of the present invention which exhibits high olefin polymerization activity.

In the catalyst of the present invention, component (C) serves as a carrier to support thereon the above-mentioned active species [i.e., the metal complex formed by the reaction between components (A) and (B-1)].

In the catalyst of the present invention, component (B-2) serves to form a linkage between the active species and component (C).

The characteristic features of the catalyst of the present invention reside in that the solid component used as component (C) has substantially no hydroxyl group, and that components (B-1) and (B-2) are provided in the form of a mixture thereof, so that even if component (B-1) has a reactive group (such as a hydroxyl group), the reactive group reacts with component (B-2). It is presumed that, due to the above-mentioned features, the active species and component (C) are bonded to each other not by chemical bonding, but by physical adsorption. The catalyst of the present invention, in which the active species and component (C) are bonded to each other by physical adsorption, is advantageous not only in that the catalyst active species is strongly bonded to the carrier (in the case of an olefin polymerization catalyst, it is especially important that the catalyst active species is strongly bonded to the carrier to thereby prevent the occurrence of adherence of a polymer scale to inside surfaces associated with a polymerizer), but also in that the catalyst exhibits high catalytic activity. This is quite unexpected, since it has conventionally been believed that, for achieving a strong bond between the active species of an olefin polymerization catalyst and the carrier, it is necessary to bond the active species and the carrier by chemical bonding. For example, WO 96/28480 discloses an olefin polymerization catalyst, in which the activator compound (which forms a metal complex as an active species in cooperation with a transition metal compound) and the carrier are bonded to each other utilizing a hydroxyl group bonded to the activator compound or the carrier. Specifically, in the Working Examples of this patent document, the immobilization of the activator compound on the carrier is performed by the following method:

(1) a method in which a carrier (such as silica) having a hydroxyl group on a surface thereof is mixed with an organometal compound [such as triethylaluminum (AlEt$_3$)], so that the hydroxyl group of the carrier reacts with the organometal compound, to thereby obtain an organometal compound-bonded carrier; and the obtained organometal compound-bonded carrier is mixed with an activator compound having a hydroxyl group (such as triethylammonium tris (pentafluorophenyl)(4-hydroxyphenyl)borate [HO—Ph—B(C$_6$H$_5$)$_3$·NHEt$_3$] so that the hydroxyl group of the activator compound reacts with the organometal compound bonded to the carrier, to thereby obtain an activator compound/organometal compound-bonded carrier composite, or (2) a method in which an activator compound having a hydroxyl group [such as triethylammonium tris (pentafluorophenyl)(4-hydroxyphenyl)borate] is mixed with an organometal compound (such as trialkylaluminum), so that the hydroxyl group of the activator compound reacts with the organometal compound, to thereby obtain an organometal compound-bonded activator compound; and the obtained organometal compound-bonded activator compound is mixed with a carrier (such as silica) having a hydroxyl group on a surface thereof, so that the hydroxyl group of the carrier reacts with the organometal compound-bonded activator compound, to thereby obtain an activator compound/organometal compound-bonded carrier composite.

In WO 96/28480, the activator compound/organometal compound-bonded carrier composite obtained by method (1) or (2) above is mixed with a transition metal compound (i.e., a compound comprising a transition metal having η-bonded thereto a cyclic anionic ligand), so that the transition metal compound reacts with the activator compound to form a metal complex which serves as an active species, to thereby obtain a catalyst.

Method (1) above and method (2) above can be illustrated by the following reaction schemes, respectively.
Method (1) (chemical bonding):
Si—OH+AlR$_3$→Si—O—AlR$_2$+RH
Si—O—AlR$_2$+HO—Ph—B(C$_6$F$_5$)$_3$·NHR$_3$ →Si—O—AlR—O—Ph—B(C$_6$F$_5$)$_3$·NHR$_3$+RH
Method (2) (chemical bonding):
AlR$_3$+HO—Ph—B(C$_6$F$_5$)$_3$·NHR$_3$ →R$_2$Al—O—Ph—B(C$_6$F$_5$)$_3$·NHR$_3$+RH
Si—OH+R$_2$Al—O—Ph—B(C$_6$F$_5$)$_3$·NHR$_3$ →Si—O—AlR—O—Ph—B (C$_6$F$_5$)$_3$·NHR$_3$+RH
That is, in the catalyst of WO 96/28480, the active species of the catalyst and the carrier are bonded to each other by chemical bonding utilizing the hydroxyl group bonded to the activator compound or the carrier, differing from the catalyst of the present invention, in which the active species of the catalyst and the carrier are bonded to each other by physical adsorption.

In the present invention, when the same components for the catalyst as mentioned above in connection with the catalyst of WO 96/28480 are used, the immobilization of the activator compound [component (B-1)] on the carrier [component (C)] can be performed by a method which can be illustrated by the following reaction schemes:
Present invention (bonding by physical adsorption):
Si—OH+AlR$_3$→Si—O—AlR$_2$ [component (C)]+RH
AlR$_3$ [component (B-2)]+HO—Ph—B(C$_6$F$_5$)$_3$·NHR$_3$ [component (B-1)]→R$_2$Al—O—Ph—B(C$_6$F$_5$)$_3$·NHR$_3$+RH
Si—O—AlR$_2$ [component (C)]+R$_2$Al—O—Ph—B(C$_6$F$_5$)$_3$·NHR$_3$ [component (B-1)+component (B-2)] →Si—O—AlR$_2$·R$_2$Al—O—Ph—B(C$_6$F$_5$)$_3$·NHR$_3$ The catalyst of the present invention exhibits high catalytic activity, as compared to the catalyst of WO 96/28480. The reason for this is considered to reside in that in the catalyst of WO 96/28480, the chemical bond formed between the active species and the carrier has an adverse effect on the active species of the catalyst to thereby lower the activity of the catalyst, whereas in the catalyst of the present invention, the catalyst active species is free from such an adverse effect as caused by the presence of a chemical bond, so that the catalyst exhibits high catalytic activity.

With respect to the term "noncoordinating, compatible anion", explanation is made as follows. The term "noncoordinating" means that the anion is incapable of forming a coordinate bond with the transition metal of component (A), or the anion is capable of forming only a weak coordinate bond with the transition metal, so that it is easily displaced by a neutral Lewis base, such as an α-olefin. Further, in the present invention, the "noncoordinating" anion is an anion which, when not forming a coordinate bond with the transition metal (in such a case, the anion functions as a charge balancing anion in the catalyst of the present invention), would not suffer decomposition, so that neutralization of component (A) in the above-mentioned complex as an active species and formation of neutral by-products due to the decomposition of the anion can be avoided. The term "compatible" means that the anion is such that, even when the activator compound (B-1) decomposes, the anion would not be degraded to neutrality, and that the anion would not harmfully affect the polymerization using the catalyst of the present invention.

Examples of (B-1) components include a compound represented by the following formula (7):

$$[L-H]^{d+}[M^m+Q_p]^{d-} \quad (7)$$

wherein:
[L-H]$^{d+}$ represents a proton-donating Brønsted acid, wherein
L represents a neutral Lewis base, and
d is an integer of from 1 to 7; and
[M$^m$+Q$_p$]$^{d-}$ represents a noncoordinating, compatible anion,
wherein
M represents a metal or metalloid of a Group selected from Groups 5 to 15 of the Periodic Table,
Q each occurrence is independently selected from the group consisting of a hydride, a halide, a C$_2$–C$_{20}$ dihydrocarbylamido group, a C$_1$–C$_{30}$ hydrocarbyloxy group, a C$_1$–C$_{30}$ hydrocarbon group and a C$_1$–C$_{40}$ substituted hydrocarbon group, wherein in not more than one occurrence is Q a halide, m is an integer of from 1 to 7,
p is an integer of from 2 to 14,
d is as defined above, and
p−m=d.

Preferred examples of (B-1) components used in the present invention include a compound represented by the following formula (8):

$$[L-H]^{d+}[M^{m+}Q_n\{G_q(T-H)_r\}_z]^{d-} \qquad (8)$$

wherein:
[L-H]$^{d+}$ represents a proton-donating Brønsted acid,
wherein
L represents a neutral Lewis base, and
d is an integer of from 1 to 7; and
$[M^{m+}Q_n\{G_q(T-H)_r\}_z]^{d-}$ represents a noncoordinating, compatible anion,
wherein
M represents a metal or metalloid of a Group selected from Groups 5 to 15 of the Periodic Table,
Q each occurrence is independently selected from the group consisting of a hydride, a halide, a C$_2$–C$_{20}$ dialkylamido group, a C$_1$–C$_{20}$ alkoxide group, a C$_6$–C$_{30}$ aryloxide group, a C$_1$–C$_{30}$ hydrocarbon group, a C$_1$–C$_{40}$ halo-substituted hydrocarbon group and a C$_1$–C$_{40}$ hydrocarbyl- or C$_1$–C$_{40}$ halohydrocarbyl-substituted organometalloid group, wherein in not more than one occurrence is Q a halide,
G each occurrence independently represents a C$_1$–C$_{30}$ multivalent hydrocarbon group having a valence of (r+1),
T represents —O—, —S—, —NR— or —PR— wherein R represents hydrogen, a C$_1$–C$_{12}$ hydrocarbyl group, a C$_1$–C$_8$ trihydrocarbylsilyl group or a C$_1$–C$_8$ trihydrocarbylgermanium group,
m is an integer of from 1 to 7,
n is an integer of from 0 to 7,
q is 0 or 1,
r is an integer of from 1 to 3,
z is an integer of from 1 to 8,
d is as defined above, and
n+z−m=d.

With respect to G group in formula (8), when G group is a divalent group, it is preferred that the G group is bonded to both of M and T.

More preferred examples of (B-1) components used in the present invention include compounds represented by the following formula (9):

$$[L-H]^{+}[BQ_3Q']^{-} \qquad (9)$$

wherein:
[L-H]$^{+}$ represents a proton-donating Brønsted acid,
wherein
L represents a neutral Lewis base containing carbon, nitrogen, phosphorus or sulfur; and
[BQ$_3$Q']$^{-}$ represents a noncoordinating, compatible anion,
wherein
Q each occurrence independently represents C$_6$–C$_{20}$ aryl group which is unsubstituted or substituted with at least one substituent selected from the group consisting of a C$_1$–C$_{12}$ hydrocarbon group and a halogen, and
Q' represents a C$_6$–C$_{20}$ aryl group substituted with a hydroxyl group.

In formula (9) above, it is preferred that L is a compound represented by the following formula:

MR$_n$ wherein:
M represents carbon, nitrogen, phosphorus or sulfur;
R each occurrence represents hydrogen, a C$_1$–C$_{30}$ linear, branched or cyclic alkyl group, a C$_1$–C$_{20}$ alkoxy group or a C$_6$–C$_{20}$ aryl group, with the proviso that, when two R groups are C$_1$–C$_{30}$ linear or branched alkyl groups, the two alkyl groups are optionally bonded together to form a ring in cooperation with M; and
n is 2 or 3, with the proviso:
that, when n is 2, M represents carbon or sulfur, and
that, when n is 3, M represents nitrogen or phosphorus.

Specific examples of proton-donating Brønsted acids used in the present invention include trialkylammonium cations obtained by replacing three of the four protons of ammonium cation by three alkyl groups, such as triethylammonium, tripropylammonium, tri(nbutyl) ammonium, trimethylammonium, tri(tertbutyl)ammonium, tri(octyl)ammonium, diethylmethylammonium, dibutylmethylammonium, dibutylethylammonium, dihexylmethylammonium, dioctylmethylammonium, didecylmethylammonium, didodecylmethylammonium, ditetradecylmethylammonium, dihexadecylmethylammonium, dioctadecylmethylammonium, diicosylmethylammonium and bis(hydrogenated tallow alkyl) methylammonium; and N,N-dialkyl anilinium cations, such as N,N-dimethylanilinium, N,N-diethylanilinium, N,N-2,4,6-pentamethylanilinium, N,N-dimethylbenzylanilinium. Further examples of proton-donating Brønsted acids include dialkylammonium cations, such as di(i-propyl) ammonium and dicyclohexylammonium; triarylphosphbnium cations, such as triphenylphosphonium, tri(methylphenyl) phosphonium and tri(dimethylphenyl)phosphonium; dialkylsulfonium cations, such as dimethylsulfonium and diethylsulfonium; and diarylsulfonium cations, such as diphenylsulfonium.

Specific examples of noncoordinating, compatible anions used in the present invention include:
triphenyl(hydroxyphenyl)borate;
diphenyldi(hydroxyphenyl)borate;
triphenyl(2,4-dihydroxyphenyl)borate;
tri(p-tolyl)(hydroxyphenyl)borate;
tris(pentafluorophenyl)(hydroxyphenyl)borate;
tris(2,4-dimethylphenyl)(hydroxyphenyl)borate;
tris(3,5-dimethylphenyl)(hydroxyphenyl)borate;
tris(3,5-di-trifluoromethylphenyl)(hydroxyphenyl)borate;
tris(pentafluorophenyl)(2-hydroxyethyl)borate;
tris(pentafluorophenyl)(4-hydroxybutyl)borate;
tris(pentafluorophenyl)(4-hydroxycyclohexyl)borate;
tris(pentafluorophenyl)[(4-(4'-hydroxyphenyl)phenyl] borate; and
tris(pentafluorophenyl)(6-hydroxy-2-naphthyl)borate.

Among these borate compounds, tris(pentafluorophenyl) (hydroxyphenyl)borate is most preferred.

Other specific examples of noncoordinating, compatible anions which can be used in the present invention include borate compounds obtained by replacing hydroxyl groups in the above-mentioned specific examples of borate compounds by an —NHR group wherein R represents a methyl group, an ethyl group or a tertbutyl group.

In the present invention, it is requisite that component (B-1) be used in an amount 0.5 to 10 times the molar amount of component (A). It is preferred that the molar amount of component (B-1) is 0.8 to 5 times, more advantageously 1 to 2 times the molar amount of component (A).

In the present invention, organometal compound (B-2) [hereinafter, frequently referred to as "component (B-2)"] is represented by the following formula (1):

$$MR_nX_{m-n} \qquad (1)$$

wherein:
M represents an element selected from the group consisting of elements of Groups 1 to 15 of the Periodic Table,
R each occurrence independently represents a $C_1$–$C_{12}$ linear, branched or cyclic alkyl group or a $C_6$–$C_{20}$ aryl group,
X each occurrence independently represents a halide, a hydride or a $C_1$–$C_{10}$ alkoxide group;
m represents a formal oxidation state of M; and
n is an integer of from 1 to m, wherein m is as defined above.

With respect to component (B-2) used in the present invention, it is preferred that:
M in formula (1) represents an element selected from the group consisting of elements of Groups 2 and 13 to 15 of the Periodic Table; and
R, X, m and n in formula (1) are as defined above for formula (1).

Component (B-2) may be a mixture of a plurality of types of compounds represented by formula (1).

Most preferred examples of component (B-2) used in the present invention include organoaluminum compounds represented by the following formula (10):

$$AlR_nX_{3-n} \qquad (10)$$

wherein
R each occurrence independently represents a $C_1$–$C_{12}$ linear, branched or cyclic alkyl group or a $C_6$–$C_{20}$ aryl group;
X each occurrence independently represents a halide, a hydride or a $C_1$–$C_{10}$ alkoxide group; and
n is 1, 2 or 3.

Examples of R groups in formula (10) representing a preferred form of component (B-2) include a methyl group, an ethyl group, a butyl group, a hexyl group, an octyl group, a decyl group, a phenyl group and a tolyl group. Examples of X groups in formula (10) representing a preferred form of component (B-2) include a methoxy group, an ethoxy group, a butoxy group and a chlorine atom.

Specific examples of (B-2) components used in the present invention include trialkylaluminum compounds, such as trimethylaluminum, triethylaluminum, tributylaluminum, trihexylaluminum, trioctylaluminum and tridecylaluminum, and reaction products of these trialkylaluminum compounds with an alcohol, such as methyl alcohol, ethyl alcohol, butyl alcohol, pentyl alcohol, hexyl alcohol, octyl alcohol, decyl alcohol or the like. Examples of such reaction products include methoxydimethylaluminum, ethoxydiethylaluminum and butoxydibutylaluminum. In the production of such reaction products, it is preferred that the mixing ratio between a trialkylaluminum and an alcohol is in the range of from 0.3 to 20, more advantageously from 0.5 to 5, still more advantageously from 0.8 to 3 in terms of the Al/OH ratio. As typical examples of reaction products obtained by reacting an alkylaluminum and an alcohol at a mixing ratio of 1 in terms of the Al/OH molar ratio, there can be mentioned methoxydimethylaluminum, ethoxydimethylaluminum, ethoxydiethylaluminum and the like.

In the present Invention, preferred examples of (B-2) components include trimethylaluminum, triethylaluminum and tributylaluminum.

In the present invention, it is requisite that the molar amount of component (B-2) be 0.05 to 20 times the molar amount of component (B-1). It is preferred that component (B-2) is used in an amount 0.07 to 2 times, more advantageously 0.1 to 1 time, most advantageously 0.2 to 0.8 time the molar amount of component (B-1).

In the present invention, component (B) [which is obtained by mixing and contacting components (B-1) and (B-2) with each other in a specific molar ratio] can be securely carried on component (C). For increasing the secureness of the carrying of component (B) on component (C), it is desired that component (B) is a reaction mixture obtained by reacting component (B-1) and component (B-2) with each other, rather than a simple mixture of components (B-1) and (B-2). Specifically, when component (B-1) is a compound represented by formula (8) above, component (B-1) has 1 to 3 T-H groups [such as a hydroxyl group as in the case of formula (9)] therein, and hence can be reacted with an organoaluminum compound (e.g., trialkylaluminum) which is a preferred example of component (B-2), thereby producing a reaction mixture wherein a part or all of component (B-1) has reacted with component (B-2). The proportion of component (B-1) reacted with component (B-2) can be easily controlled by changing the mixing ratio of components (B-1) and (B-2). For example, when component (B-1) has one T-H group (such as a hydroxyl group), components (B-1) and (B-2) may react with each other at a [(B-1)/(B-2)] molar ratio of 1 or more, depending on the number of the reactive organic group(s) in component (B-2). When the molar amount of component (B-1) is the same as or smaller than a threshold amount at which all the reactive organic group(s) in component (B-2) are consumed by the reaction with component (B-1), all of component (B-1) reacts with component (B-2). When the molar amount of component (B-1) is larger than a threshold amount at which all the reactive organic group(s) in component (B-2) are consumed by the reaction with component (B-1), a part of component (B-1) remains unreacted with component (B-2). When component (B) is a reaction mixture obtained by reacting a part or all of component (B-1) with component (B-2), component (B) can be very securely carried on component (C), so that the objective of the present invention can be very effectively attained.

In the production of the catalyst of the present invention, component (B) can be securely carried on component (C), and, then, component (A) can be securely carried on component (C) through component (B). Alternatively, the production of the catalyst of the present invention can also be performed by a method in which component (A) is first contacted with component (B) to obtain a complex of components (A) and (B), and the obtained complex is then contacted with component (C), thereby causing component (A) to be securely carried on component (C) through component (B).

In the present invention, component (C) (i.e., solid component having substantially no hydroxyl group) is used for supporting thereon components (A) and (B) which together form a catalyst active species.

Component (C) (having substantially no hydroxyl group) used in the present invention can be obtained by subjecting a solid substance [hereinafter, frequently referred to as a "precursor of component (C)"] to the below-described treatment for removing the hydroxyl groups from the surface of the precursor of component (C).

Examples of precursor of component (C) include porous polymer materials, wherein the matrix thereof comprises, e.g., polyethylene, polypropylene or a styrene-divinylbenzene copolymer; and inorganic solid oxides of elements of Groups 2 to 4, 13 and 14 of the Periodic Table, such as silica, alumina, magnesia, magnesium chloride, zirconia, titania, boron oxide, calcium oxide, zinc oxide, barium oxide, vanadium(V) oxide, chromium oxide, thorium oxide, mixtures thereof and oxide complexes thereof. Examples of oxide complexes containing silica include oxide complexes of silica and an oxide of an element selected from elements of Group 2 or 13 of the Periodic Table, such as silica-magnesia and silica-alumina. In the present invention, it is preferred that the precursor of component (C) is selected from silica, alumina and oxide complexes of silica and an oxide of an element selected from elements of Group 2 or 13 of the Periodic Table. Among these inorganic solid oxides, especially preferred is silica.

With respect to the morphology of a silica product used as a precursor of component (C), there is no particular limitation, and the silica may be in granular, spherical, agglomerated or fumed or any other form. Preferred examples of commercially available silica products include SD 3216.30, SP-9-10046, Davison Syloid™ 245, Davison 948 and Davison 952 [all of which are manufactured and sold by Grace Davison (a division of W. R. Grace & Co., USA)]; Aerosil 812 (manufactured and sold by Deggusa AG, Germany); ES70X (manufactured and sold by Crossfield, USA); and P-6 and P-10 (both manufactured and sold by Fuji Silysia Chemical Ltd., Japan).

It is preferred that component (C) used in the present invention has a specific surface area of from 10 to 1,000 m$^2$/g, more advantageously 100 to 600 m$^2$/g, as determined by nitrogen porosimetry using the Brunauer-Emmett-Teller (B.E.T.) method. A representative example of component (C) having such a high specific surface area is component (C) comprised of a porous material having a large number of pores.

In the present invention, the porosity of component (C) is generally 5 cm$^3$/g or less, preferably 0.1 to 3 cm$^3$/g, more preferably 0.2 to 2 cm$^3$/g, as determined by nitrogen porosimetry.

With respect to the average particle size of component (C) used in the present invention, there is no particular limitation. The average particle size of component (C) is generally from 0.5 to 500 μm, preferably from 1 to 200 μm, more preferably from 5 to 100 μm.

In the present invention, component (C) having substantially no hydroxyl group can be obtained by subjecting the precursor of component (C) to chemical treatment so as to remove the hydroxyl groups from the surface of the precursor of component (C).

In the present invention, the term "solid component having substantially no hydroxyl group" means that no hydroxyl groups are detected on the surface of the solid component [as component (C)] as measured by the following method (i) or (ii). In method (i), to a slurry obtained by dispersing component (C) in a solvent is added a predetermined excess amount of a dialkylmagnesium, to thereby cause the surface hydroxyl groups of component (C) to undergo a reaction with the dialkylmagnesium, and then the amount of the dialkylmagnesium remaining unreacted in the solvent is measured by a conventional method in order to determine the amount of the dialkylmagnesium reacted with the surface hydroxyl groups of component (C), and, based on the amount of the reacted dialkylmagnesium, the original hydroxyl group content of component (C) is determined. This method is based on the reaction between a hydroxyl group and the dialkylmagnesium, which is represented by the following reaction formula:

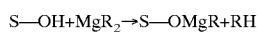

wherein
S represents the solid component [component (C)]; and
R represents an alkyl group.

In method (ii), which is more preferred to method (i) above, ethoxydiethylaluminum is used instead of a dialkylmagnesium. Specifically, in method (ii), ethoxydiethylaluminum is caused to react with the surface hydroxyl groups of component (C), thereby generating ethane gas, and the amount of the generated ethane gas is measured using a gas burette, and, based on the amount of the generated ethane gas, the original hydroxyl group content of component (C) is determined.

Further, in the present invention, it is preferred that the precursor of component (C) is subjected to heat treatment so as to remove water (such as crystal water or adsorbed water). The heat treatment of the precursor of component (C) can be performed, for example, at a temperature of from 150° C. to 1,000° C., preferably from 250° C. to 800° C., in an inert atmosphere or reductive atmosphere for 1 hour to 50 hours.

In the present invention, it is more preferred that, after the heat treatment for dehydration, the precursor of component (C) is further subjected to a chemical treatment so as to remove the hydroxyl groups from the surface of the precursor of component (C) to obtain component (C).

With respect to the chemical treatment conducted for removing the hydroxyl groups from the precursor of component (C), it is recommended to employ a chemical treatment in which the precursor of component (C) is contacted with an organometal compound. Examples of organometal compounds used for the chemical treatment include compounds of elements of Groups 2 to 13 of the Periodic Table. Among these compounds, especially preferred are organoaluminum compounds and organomagnesium compounds.

A preferred example of the organoaluminum compound used in the chemical treatment of the precursor of component (C) is represented by the following formula (10):

$$AlR_nX_{3-n} \tag{10}$$

wherein
R each occurrence independently represents a $C_1$–$C_{12}$ linear, branched or cyclic alkyl group or a $C_6$–$C_{20}$ aryl group;
X each occurrence independently represents a halide, a hydride or a $C_1$–$C_{10}$ alkoxide group; and
n is 1, 2 or 3.

The compounds represented by formula (10) above may be used individually or in combination.

Examples of R groups in formula (10) [representing a preferred form of the organoaluminum compound used in the chemical treatment of the precursor of component (C)] include a methyl group, an ethyl group, a propyl group, a butyl group, a hexyl group, an octyl group, a decyl group, a phenyl group and a tolyl group. Examples of X groups in formula (10) [representing a preferred form of the organoaluminum compound used in the chemical treatment of the precursor of component (C)] include a methoxy group, an ethoxy group, a butoxy group, a hydrogen atom and a chlorine atom.

Specific examples of organoaluminum compounds used in the chemical treatment of the precursor of component (C) include trialkylaluminum compounds, such as trimethylaluminum, triethylaluminum, tributylaluminum, trihexylaluminum, trioctylaluminum and tridecylaluminum; and reaction products of these trialkylaluminum compounds with an alcohol, such as methyl alcohol, ethyl alcohol, butyl alcohol, pentyl alcohol, hexyl alcohol, octyl alcohol, decyl alcohol or the like. Examples of such reaction products include methoxydimethylaluminum, ethoxydiethylaluminum and butoxydibutylaluminum. In the production of such reaction products, it is preferred that the ratio of the trialkylaluminum to the alcohol is in the range of from 0.3 to 20, more advantageously from 0.5 to 5, still more advantageously from 0.8 to 3 in terms of the Al/OH molar ratio.

A preferred example of the organomagnesium compound used in the chemical treatment of the precursor of component (C) is represented by the following formula (11):

$$MgR_nX_{2-n} \quad (11)$$

wherein
R each occurrence independently represents a $C_1$–$C_{12}$ linear, branched or cyclic alkyl group or a $C_6$–$C_{20}$ aryl group;
X each occurrence independently represents a halide, a hydride or a $C_1$–$C_{10}$ alkoxide group; and
n is 1 or 2.

The compounds represented by formula (11) above may be used individually or in combination.

Examples of R groups in formula (11) [representing a preferred form of the organomagnesium compound used in the chemical treatment of the precursor of component (C)] include a methyl group, an ethyl group, a propyl group, a butyl group, a hexyl group, an octyl group, a decyl group, a phenyl group and a tolyl group. Examples of X groups in formula (11) [representing a preferred form of the organomagnesium compound used in the chemical treatment of the precursor of component (C)] include a methoxy group, an ethoxy group, a butoxy group, a hydrogen atom and a chlorine atom.

Specific examples of organomagnesium compounds used in the chemical treatment of the precursor of component (C) include diethylmagnesium, dibutylmagnesium, butylethylmagnesium and butyloctylmagnesium.

In the chemical treatment of the precursor of component (C), the above-mentioned organoaluminum compound and the above mentioned organomagnesium compound may be used in the form of a mixture thereof.

In the chemical treatment of the precursor of component (C), the organometal compound is used in an amount which is the same as or larger than the molar amount of the hydroxyl groups on the surface of the precursor of component (C). With respect to the upper limit of the organometal compound used in the chemical treatment, the upper limit is generally an amount 10 times, preferably 5 times, more preferably 2 times, still more preferably 1.5 times, most preferably 1.3 times the molar amount of the hydroxyl groups on the surface of the precursor of component (C).

In the present invention, when the hydroxyl groups on the surface of the precursor of component (C) are removed by a chemical treatment using an organometal compound in an amount larger than the amount of the hydroxyl groups, the surplus amount of organometal compound used remains unreacted. If desired, the remaining amount of remaining organometal compound may be reduced to a desired level by a known method, such as filtration or decantation.

Further, in the present invention, it is especially preferred that component (C) is a treated silica having substantially no hydroxyl group. Such a treated silica can be obtained by a method comprising: subjecting a silica to heat treatment at a temperature of 150° C. or more, preferably 250° C. or more to thereby obtain a pretreated silica having hydroxyl groups on the surface thereof in an amount of from 0.05 to 10 mmol per gram of the silica; and treating the pretreated silica with an organometal compound. As the organometal compound used in the treatment of silica [precursor of component (C)], it is preferred to use an organoaluminum compound, and it is especially preferred to use an organoaluminum compound of formula (10) above. The organoaluminum compound is used in an amount 1 to 10 times the molar amount of the hydroxyl groups on the surface of the pretreated silica. Further, if desired, any organoaluminum compound remaining unreacted may be removed to a desired extent by a known method, such as filtration or decantation.

With respect to the above-mentioned pretreated silica, it is more preferred that the amount of hydroxyl groups on the surface of the pretreated silica is in the range of from 0.1 to 5 mmol, most advantageously from 0.5 to 2 mmol, per gram of the pretreated silica.

In the present invention, if desired, organoaluminum compound (D) [hereinafter, frequently referred to as "optional component (D)"] is optionally used in the catalyst.

By using optional component (D) in the catalyst of the present invention, an active species formed by components (A) and (B) can be more securely supported on component (C) by physical adsorption.

The use of optional component (D) is especially preferred when component (B) contains unreacted component (B-1). In such a case, by the use of optional component (D), it becomes possible to surely prevent the active species from being bonded to component (C) by chemical bonding.

A preferred example of optional component (D) is represented by the following formula (10):

$$AlR_nX_{3-n} \quad (10)$$

wherein
R each occurrence independently represents a $C_1$–$C_{12}$ linear, branched or cyclic alkyl group or a $C_6$–$C_{20}$ aryl group;
X each occurrence independently represents a halide, a hydride or a $C_1$–$C_{10}$ alkoxide group; and
n is 1, 2 or 3.

Optional component (D) may be a mixture of a plurality of types of compounds represented by formula (10) above.

Examples of R groups in formula (10) representing a preferred form of component (D) include a methyl group, an ethyl group, a propyl group, a butyl group, a hexyl group, an octyl group, a decyl group, a phenyl group and a tolyl group. Examples of X groups in formula (10) representing a preferred form of component (D) include a methoxy group, an ethoxy group, a butoxy group, a hydrogen atom and a chlorine atom.

Specific examples of (D) components used in the present invention include trialkylaluminum compounds, such as trimethylaluminum, triethylaluminum, tributylaluminum, trihexylaluminum, trioctylaluminum and tridecylaluminum; and reaction products of these trialkylaluminum compounds with an alcohol, such as methyl alcohol, ethyl alcohol, butyl alcohol, pentyl alcohol, hexyl alcohol, octyl alcohol, decyl alcohol or the like. Examples of such reaction products include methoxydimethylaluminum, ethoxydiethylaluminum and butoxydibutylaluminum. In the production of such reaction products, it is preferred that the ratio of the trialkylaluminum to the alcohol is in the range of from 0.3 to 20, more advantageously from 0.5 to 5, still more advantageously from 0.8 to 3 in terms of the Al/OH molar ratio.

In the present invention, when optional component (D) is used, the molar amount of component (D) is 0.01 to 1,000 times, preferably 0.1 to 100 times, more preferably 1 to 10 times the molar amount of component With respect to the method for producing the catalyst of the present invention, the catalyst can be obtained by contacting components (A) to (C) and optionally component (D).

With respect to the specific method for producing the catalyst of the present invention, there is no particular limitation. Examples of specific methods for producing the catalyst of the present invention include:

(a) a method comprising the steps of:
  (i) intimately mixing and contacting components (B-1) and (B-2) with each other to form component (B),
  (ii) intimately mixing and contacting components (A) and (B) with each other to thereby obtain a mixture of components (A) and (B), and
  (iii) intimately mixing and contacting the obtained mixture of components (A) and (B), and component (C) with each other,
wherein component (D) may be optionally added at any time after the step (i); and (b) a method comprising the steps of:
  (i) intimately mixing and contacting components (B-1) and (B-2) with each other to form component (B),
  (ii) intimately mixing and contacting component (B) and component (C) with each other to thereby obtain a mixture of components (B) and (C), and
  (iii) intimately mixing and contacting component (A) and the obtained mixture of components (B) and (C) with each other,
wherein component (D) may be optionally added at any time after the step (i).

In the present invention, there is no particular limitation with respect to the method for adding optional component (D) to the system for producing the catalyst of the present invention. However, it is preferred that the addition of optional component (D) is performed as follows. In method (a) or (b) above, at least one member selected from the group consisting of component (A) [used in the step (ii) of method (a) above or the step (iii) of method (b) above] and component (C) [used in the step (iii) of method (a) above or the step (ii) of method (b) above] is used in the form of a mixture thereof with component (D). Further, in method (b) above, component (D) may be added to the mixture obtained in the step (ii) before the step (iii).

In the present invention, it is most preferred that the catalyst is produced by method (b) above, wherein at least one member selected from the group consisting of component (A) used in the step (iii) and component (C) used in the step (ii) is optionally in the form of a mixture thereof with component (D), and component (D) is optionally added to the mixture which is obtained in the step (ii) before the step (iii).

In the production of the catalyst of the present invention, it is preferred to use component (C) which has been obtained by treating the precursor of component (C) by the above-mentioned method. In this case, the catalyst of the, present invention can be produced by, for example, the steps of:

(i) treating a precursor of component (C) (such as silica) having hydroxyl groups on the surface thereof with an organometal compound [such as an organoaluminum compound] which is used in an amount larger than the molar amount of the hydroxyl groups on the surface of the precursor of component (C), wherein the organometal compound reacts with the hydroxyl groups, to thereby obtain a reaction mixture containing component (C) having substantially no hydroxyl groups and an unreacted organometal compound;

(ii) subjecting the obtained reaction mixture to filtration, decantation or the like, to thereby reduce the content of the unreacted organometal compound in the reaction mixture to a desired level;

(iii) optionally mixing and contacting optional component (D) and the reaction mixture containing component (C) with each other, to thereby obtain a mixture containing component (C) and optional component (D);

(iv) mixing and contacting component (B) and the reaction mixture containing component (C) obtained in step (ii) above or the mixture obtained in step (iii) above with each other, to thereby obtain component (B) which is securely supported on component (C); and (v) mixing and contacting component (A) [which may be used in the form of a mixture thereof with component (D)] and the obtained component (B) supported on component (C), thereby obtaining the catalyst of the present invention in which a metal complex as an active species is formed of components (A) and (B).

In this method, when the organometal compound used in step (1) above for treating the precursor of component (C) is an organoaluminum compound (such as a trialkylaluminum), step (ii) above [for reducing the content of the unreacted organometal compound in the reaction mixture containing component (C)] may be omitted so as to use the whole of unreacted organoaluminum compound as component (D). Specifically, when the organometal compound used for treating the precursor of component (C) is an organoaluminum compound, the catalyst of the present invention can be produced by, for example, a method comprising:

(i) treating silica [precursor of component (C)], which has been dehydrated by calcination at 150° C. or more and which has hydroxyl groups on the surface thereof, with an organoaluminum compound (such as trialkylaluminum) which is used in an amount larger than the molar amount of the hydroxyl groups on the surface of the silica, wherein the organoaluminum compound reacts with the hydroxyl groups, to thereby obtain a reaction mixture containing a treated silica having substantially no water and substantially no hydroxyl group, and an unreacted organoaluminum compound;

(ii) mixing and contacting the reaction mixture containing the treated silica and the unreacted organoaluminum compound with each other, and as component (B), a reaction mixture obtained by reacting component (B-1) [such as bis (hydrogenated tallow aklyl methylammonium tris (pentafluorophenyl) (hydroxyphenyl) borate with component (B-2)(e.g., an organoaluminum compound, such as trialkylaluminum); and (iii) mixing and contacting the resultant mixture and component (A) [e.g., a compound of formula (6) above, such as {(N-t-butylamido)(tetramethyl-η$^5$-cyclopentadienyl)dimethylsilane}titanium 1,3-pentadiene] with each other, to thereby obtain a catalyst.

Further, when the treatment of the precursor of component (C) is conducted using an organometal compound falling within the definition of component (B-2) in an amount larger than the molar amount of the hydroxyl groups on the surface of the precursor of component (C), the unreacted organometal compound may be used as component (B-2). In this case, for example, the catalyst of the present invention can be produced by a method comprising the steps of:

(i) treating a precursor of component (C) having hydroxyl groups on the surface thereof with an organometal compound which falls within the definition of component (B-2) [e.g., an organoaluminum compound, such as trialkylaluminum)] in an amount which is larger than the molar amount of the hydroxyl groups on the surface of the precursor of component (C), wherein the organometal compound reacts with the hydroxyl groups, to thereby obtain a reaction mixture containing component (C) having substantially no water and substantially no hydroxyl group, and an unreacted organometal compound;

(ii) mixing and contacting component (B-1) and the obtained reaction mixture containing component (C) and the unreacted organometal compound [which serves as component (B-2)] with each other to thereby obtain component (B) which is securely supported on component (C); and (iii) mixing and contacting component (A) and the obtained component (B) supported on component (C) to thereby obtain the catalyst of the present invention in which an active species is formed by the reaction between component (A) and component (B-1).

This method is advantageous from the viewpoint of ease in operation. Specific examples of this method include a method comprising:

(i) treating silica [precursor of component (C)], which has been dehydrated by calcination at 150° C. or more and which has hydroxyl groups on the surface thereof, with triethylaluminum which is used in an amount larger than the molar amount of the hydroxyl groups on the surface of the silica, wherein the triethylaluminum reacts with the hydroxyl groups, to thereby obtain a reaction mixture containing a treated silica [component (C)] having substantially no water and substantially no hydroxyl groups, and an unreacted triethylaluminum;

(ii) mixing and contacting component (B-1) [e.g., a compound of formula (9) above, such as bis(hydrogenated tallow alkyl)methylammonium tris(pentafluorophenyl)(hydroxyphenyl)borate] and the obtained reaction mixture containing the treated silica [component (C)] and the unreacted triethylaluminum [which serves as component (B-2)] with each other to thereby obtain component (B) which is securely supported on the silica; and (iii) mixing and contacting the thus obtained component (B) and component (A) (e.g., a compound of formula (6) above, such as {(N-t-butylamido)(tetramethyl-η$^5$-cyclopentadienyl)dimethylsilane}titanium 1,3-pentadiene] with each other to thereby obtain a catalyst.

However, for efficiently producing the excellent catalyst of the present invention, it is preferred to use a method in which component (B), which is either a simple mixture of components (B-1) and (B-2) or a reaction mixture obtained by reacting component (B-1) and component (B-2), is formed prior to the contact thereof with other components of the catalyst.

Further, when use is made of component (B) which is in the form of a reaction mixture containing an unreacted component (B-1), it is preferred that, in the step of the mixing and contacting of components (B) and (C), which may optionally be performed in the presence of component (A) and/or component (D), the whole of unreacted component (B-1) is completely reacted with at least one compound selected from the group consisting of an organometal compound falling within the definition of component (B-2), which has remained unreacted in a reaction mixture obtained by the treatment of the precursor of component (C), and component (D) falling within the definition of component (B-2). It is preferred that the above-mentioned at least one compound is an organoaluminum compound represented by formula (10) above. The amount of the above-mentioned at least one compound is preferably 1 to 1,000 times, more preferably 1 to 100 times, most preferably 1 to 10 times the molar amount of the unreacted component (B-1) any one of the above-mentioned methods, it is possible to produce the catalyst of the present invention in which an active species formed by the reaction between components (A) and (B-1) is very securely supported on component (C).

The catalyst of the present invention, which is produced by any one of the above-mentioned methods, is advantageous in that it not only has high polymerization activity, but also is capable of maintaining such a high polymerization activity for a prolonged period of time. Further, the catalyst of the present invention is also capable of producing an olefin polymer having excellent powder characteristics by suspension polymerization (slurry polymerization), or gaseous phase polymerization, while preventing unfavorable phenomena, such as the occurrence of adherence of the polymer to various inside surfaces associated with the polymerizer, thereby enabling an olefin polymer having excellent powder characteristics to be efficiently produced by a continuous operation of a commercial scale plant.

In each of these methods for producing the catalyst of the present invention, in which components (A), (B), (C), and optional component (D) are contacted, it is preferred that the mixing and contacting of component (A) with at least one of the other components is performed in a good solvent for component (A). In addition, it is also preferred that the mixing and contacting of optional component (D) with at least one of the other components is performed in a good solvent for optional component (D).

Further, in the present invention, it is preferred that the mixing and contacting of component (B-1) with component (B-2) is performed in a good solvent for components (B-1) and (B-2). Further, when the mixing and contacting of component (B) [which is obtained by mixing and contacting components (B-1) and (B-2) with each other] with component (A) and/or optional component (D) is performed prior to the mixing and contacting of component (B) with component (C), it is preferred that the mixing and contacting is performed in a good solvent for components (B-1) and (B-2).

On the other hand, it is preferred that the mixing and contacting of component (B) [which is obtained by mixing and contacting components (B-1) and (B-2) with each other] with component (C) so as to cause component (B) to be supported on component (C) is performed in a poor solvent for component (B). In the present invention, when the mixing and contacting of component (B) and component (C) is performed in a poor solvent for component (B), component (B) can be very securely carried on component (C). The mixing and contacting of components (B) and (C) may be performed by, for example, a method in which at least one of components (B) and (C) is used in the form of a mixture of thereof with at least one of components (A) and component (D). Also in this case, it is preferred that the mixing and contacting of component (B) and component (C) is performed in a poor solvent for component (B).

Examples of good solvents for component (B) used in the present invention include aromatic compounds, such as benzene, toluene and xylene. Examples of poor solvents for component (B) used in the present invention include linear or branched aliphatic hydrocarbon compounds, such as isobutane, pentane, isopentane, hexane, heptane, octane, decane, dodecane and kerosine, and ISOPAR E (tradename of a liquid hydrocarbon mixture manufactured and sold by Exxon Chemical Co., USA).

Examples of good solvents for component (A) and optional component (D) used in the present invention include linear or branched aliphatic hydrocarbon compounds, such as isobutane, pentane, isopentane, hexane, heptane, octane, decane, dodecane and kerosine; aromatic compounds, such as benzene, toluene and xylene; and ISOPAR E (tradename of a liquid hydrocarbon mixture manufactured and sold by Exxon Chemical Co., USA).

The method of the present invention for homopolymerizing ethylene or copolymerizing ethylene with at least one comonomer in the presence of the catalyst of the present invention will now be illustratively described.

In the presence of the olefin polymerization catalyst of the present invention, ethylene can be homopolymerized or copolymerized with at least one comonomer selected from the group consisting of an α-olefin represented by the formula $H_2C=CHR$ wherein R is a methyl group, an ethyl group, a $C_3-C_{18}$ linear, branched or cyclic alkyl group or a $C_6-C_{20}$ aryl group, a $C_3-C_{20}$ cyclic olefin, and a $C_4-C_{20}$ linear, branched or cyclic diene.

Examples of α-olefins represented by the formula $H_2C=CHR$ wherein R is a methyl group, an ethyl group or a $C_3-C_{18}$ linear, branched or cyclic alkyl group include propylene, 1-butene, 1-pentene, 1-hexene, 4-methyl-1-pentene, 1-octene, 1-decene, 1-dodecene, 1-tetradecene, 1-hexadecene, 1-octadecene and 1-icosene. Examples of $C_3-C_{20}$ cyclic olefins include cyclopentene, cyclohexene, cycloheptene, norbornene, 5-methyl-2-norbornene, tetracyclododecene and 2-methyl-1,4,5,8-dimethano-1,2,3,4,4a,5,8,8a-octahydronaphthalene. Examples of α-olefins represented by the formula $H_2C=CHR$ wherein R is a $C_6-C_{20}$ aryl group include styrene and vinylcyclohexane. Examples of $C_4-C_{20}$ linear, branched or cyclic dienes include 1,3-butadiene, 1,4-pentadiene, 1,5-hexadiene, 1,4-hexadiene and cyclohexadiene.

By copolymerizing ethylene with an olefin (comonomer) appropriately selected the above olefins, an ethylene polymer having suitably controlled density and properties can be obtained.

In the present invention, the polymerization and copolymerization of ethylene can be conducted by either suspension polymerization or gaseous phase polymerization.

In the suspension polymerization, an inert hydrocarbon can be used as the reaction medium. The olefin itself can also be used as the medium.

Representative examples of such inert hydrocarbon reaction media include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethyl chloride, chlorobenzene and dichloromethane; and mixtures of them.

In the polymerization method using the olefin polymerization catalyst of the present invention, it is preferred that the amount of the catalyst fed to the reaction system for homopolymerizing or copolymerizing ethylene is controlled so that the amount of the catalyst becomes 1 to 0.0001% by weight, preferably 0.1 to 0.001% by weight, based on the total weight of the polymer obtained per hour. The polymerization temperature is generally not lower than 0° C., preferably not lower than 50° C., more preferably not lower than 60° C., and, generally not higher than 150° C., preferably not higher than 110° C., more preferably not higher than 100° C. The polymerization pressure is generally from atmospheric pressure to 100 kg/cm$^2$, preferably from 2 to 50 kg/cm$^2$, more preferably from 5 to 30 kg/cm$^2$. The polymerization reaction can be conducted in a batchwise manner, a semicontinuous manner, or a continuous manner. Further, the polymerization reaction can be performed using at least two reactors, wherein the reaction conditions in the at least two reactors are the same or different. In this case, the at least two reactors may be connected to each other in parallel or in series.

The molecular weight of the olefin polymer obtained can be controlled by introducing hydrogen gas into the polymerization reaction system or by controlling the polymerization temperature (see, for example, DE 3127133.2).

In the present invention, the olefin polymerization catalyst can contain other components than mentioned above, which have favorable effects on the olefin polymerization.

By the polymerization method using the olefin polymerization catalyst of the present invention, it has become possible to produce an olefin polymer having excellent powder characteristics. Specifically, since the polymer is obtained in the form of powder having not only a narrow particle diameter distribution but also a high bulk density, the polymer obtained exhibits excellent fluidity.

The polymer obtained by the polymerization method using the catalyst of the present invention generally has an average particle diameter of from 100 to 1,000 μm, preferably from 150 to 800 μm. When the average particle diameter of the polymer is outside the above-mentioned range, the powder characteristics of the polymer are likely to become poor.

The bulk density of the polymer obtained by the polymerization method using the catalyst of the present invention is generally as high as 0.25 g/cm$^3$ or more, preferably 0.27 g/cm$^3$ or more, more preferably 0.30 g/cm$^3$ or more.

BEST MODE FOR CARRYING OUT THE INVENTION

Hereinbelow, the present invention will be described in more detail with reference to the following Examples and Comparative Examples, which should not be construed as limiting the scope of the present invention.

[Amount of hydroxyl groups on the surface of silica]

In the present invention, the molar amount of the hydroxyl groups on the surface of silica per 1 g of silica was determined as follows.

In a dry nitrogen atmosphere, 5 ml of ethoxydiethylaluminum was placed in a 10 ml dropping funnel equipped with a 20 ml Erlenmeyer flask containing 1 g of dehydrated silica, wherein the open end of the flask is connected to a gas burette. Then, the ethoxydiethylaluminum was added to the dehydrated silica in the flask in the dry nitrogen atmosphere to effect a reaction of the ethoxydiethylaluminum with the hydroxyl groups on the surface of silica, to thereby generate ethane.

Subsequently, the volume of the generated ethane was measured by means of the gas burette to obtain the molar amount of the generated ethane, which is equal to the molar amount of the hydroxyl groups on the surface of silica.

The molar amount of hydroxyl groups on the surface of 1 g of the dehydrated silica is thus obtained.

[Average particle diameter of the ethylene polymer]

In the present invention, the average particle diameter of the ethylene polymer was determined by the sieving method [see "Funtai no zairyo kagaku" (Material chemistry of powders), pages 166 to 169, edited by Yasuo Arai (BAIFUKAN CO., Ltd., Japan, 1987)] using a plurality of standard sieves, each of which is in conformity with Japanese Industrial Standard (JIS) Z 8801.

The method can be summarized as follows:

The ethylene polymer in powder form was successively passed through a plurality of the standard sieves, which were used in the order of mesh size from the sieve having the largest mesh size, and then the weight of the ethylene polymer remaining on each of the sieves was determined, to thereby determine the particle size distribution of the ethylene polymer, based on the weights of the ethylene polymer fractions remaining on the sieves having predetermined mesh sizes. Subsequently, the average particle diameter of the ethylene polymer was calculated, based on the above-mentioned particle size distribution.

EXAMPLE 1

(Preparation of a Triethylaluminum-treated Silica)

1 g of silica P-10 (manufactured and sold by Fuji Silysia Chemical Ltd., Japan) was calcined at 400° C. in a nitrogen atmosphere for 5 hours to effect dehydration of the silica P-10. The amount of hydroxyl groups on the surface of the dehydrated silica was 1.3 mmol/g of $SiO_2$. 1 g of the dehydrated silica was dispersed in 40 ml of hexane, to thereby obtain a slurry. To the obtained slurry was added 1.5 ml of a 1 M hexane solution of triethylaluminum, and the resultant mixture was stirred for one hour to effect a reaction of the triethylaluminum with the hydroxyl groups on the surface of the silica, thereby obtaining a reaction mixture containing a triethylaluminum-treated silica and a supernatant, wherein each of the hydroxyl groups on the surface of the triethylaluminum-treated silica was blocked. Subsequently, the supernatant contained in the reaction mixture was removed by decantation so that the unreacted triethylaluminum contained in the supernatant was removed, followed by adding thereto an appropriate amount of hexane, thereby obtaining a slurry of triethylaluminum-treated silica in hexane having a volume of 50 ml. The supernatant removed by decantation was subjected to the test for measuring the amount of triethylaluminum contained in the supernatant. As a result, it was found that the supernatant contained 0.07 mmol of triethylaluminum.

(Preparation of a Silica-supported Catalyst)

1.14 g of bis(hydrogenated tallow alkyl) methylammonium tris(pentafluorophenyl)(4-hydroxyphenyl)borate (hereinafter, referred to simply as "borate") was added to and dissolved into 10 ml of toluene, to thereby obtain a 100 mM toluene solution of the borate.

1 ml of a 0.1 M toluene solution of trimethylaluminum was added to the above-obtained toluene solution of the borate at room temperature, and then, toluene was further added thereto so that the concentration of the borate in the toluene solution became 50 mM, followed by stirring at room temperature for one hour, to thereby obtain a reaction mixture containing the borate.

1.6 ml of the above-obtained reaction mixture containing the borate was added to 50 ml of the above-obtained slurry of the (triethylaluminum-treated) silica, followed by stirring for one hour, to thereby cause the borate to be supported on the silica, thus obtaining a slurry of a silica having supported thereon the borate.

To the above-obtained slurry was added 0.8 ml of a solution obtained by dissolving 10 mmol of [(N-t-butylamido)(tetramethyl-$\eta^5$-cyclopentadienyl) dimethylsilane]titanium 1,3-pentadiene (hereinafter, referred to as "titanium complex") in 100 ml of ISOPAR E (tradename of a liquid hydrocarbon mixture manufactured and sold by Exxon Chemical Co., USA), and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the resultant reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

800 ml of hexane was charged into a 1.8-liter autoclave, and then, pressurized ethylene was introduced into the autoclave to elevate the internal pressure of the autoclave to 10 kg/cm$^2$-G, followed by introduction of 5 ml of 1-butene to the autoclave. Then, the internal temperature of the autoclave was elevated to 70° C., and the above-obtained slurry of a solid catalyst was charged into the autoclave in an amount of 15 mg in terms of the weight of the solid catalyst, to thereby start copolymerization of ethylene with 1-butene. The copolymerization was performed for 60 minutes, while introducing ethylene into the autoclave so as to maintain the internal pressure of the autoclave at 10 kg/cm$^2$-G. After completion of the copolymerization, the resultant reaction mixture (which was a slurry of a copolymer) was taken out of the autoclave, and the catalyst was deactivated with methanol, and the reaction mixture was subjected to filtration, washing and drying, to thereby obtain 90 g of a dry powder of copolymer. When the inside of the autoclave was examined, no polymer adhering to the inner wall and the like of the autoclave was observed. The catalytic activity of the catalyst was 1,900 kg of polymer/g-Ti·hr.

The obtained powder of copolymer had an average particle diameter of about 400 μm and a bulk density of 0.28 g/cm$^3$, and exhibited an extremely excellent fluidity. Thus, the obtained powder of copolymer was found to exhibit excellent powder characteristics.

The results are shown in Table 1.

EXAMPLE 2

(Preparation of a Triethylaluminum-treated Silica)

50 ml of a slurry of a triethylaluminum-treated silica was obtained in substantially the same manner as in Example 1.

(Preparation of a Silica-supported Catalyst)

1.14 g of bis(hydrogenated tallow alkyl) methylammonium tris(pentafluorophenyl)(4-hydroxyphenyl)borate (hereinafter, referred to simply as "borate") was added to and dissolved into 10 ml of toluene, to thereby obtain a 100 mM toluene solution of the borate.

0.5 ml of a 0.1 M toluene solution of trimethylaluminum was added to the obtained toluene solution of the borate at room temperature, and then, toluene was further added thereto so that the concentration of the borate became 50 mM, followed by stirring at room temperature for one hour, to thereby obtain a reaction mixture containing the borate.

0.05 ml of a 0.1 M toluene solution of trimethylaluminum was added to 50 ml of the above-obtained slurry of the (triethylaluminum-treated) silica, followed by stirring for 15 minutes, thereby obtaining a mixture. Subsequently, 1.6 ml of the above-obtained reaction mixture containing the borate was added to the above-obtained mixture, followed by stirring for one hour, to thereby cause the borate to be supported on the silica, thus obtaining a slurry of a silica having supported thereon the borate.

To the above-obtained slurry was added 0.8 ml of a solution obtained by dissolving 10 mmol of [(N-t-butylamido)(tetramethyl-$\eta^5$-cyclopentadienyl)dimethylsilane]titanium 1,3-pentadiene (hereinafter, referred to as "titanium complex") in 100 ml of ISOPAR E, and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the resultant reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

The copolymerization was conducted in substantially the same manner as in Example 1. After completion of the copolymerization, the resultant reaction mixture (which was a slurry of a copolymer) was taken out of the autoclave, and the catalyst was deactivated with methanol, and the reaction mixture was subjected to filtration, washing and drying, to thereby obtain 85 g of a dry powder of copolymer. When the inside of the autoclave was examined, no polymer adhering to the inner wall and the like of the autoclave was observed. The catalytic activity of the catalyst was 1,800 kg of polymer/g-Ti·hr.

The obtained powder of copolymer had an average particle diameter of about 400 μm and a bulk density of 0.26 g/cm$^3$, and exhibited an extremely excellent fluidity. Thus, the obtained powder of copolymer was found to exhibit excellent powder characteristics.

The results are shown in Table 1.

EXAMPLE 3

(Preparation of a Triethylaluminum-treated Silica)

50 ml of a slurry of a triethylaluminum-treated silica was obtained in substantially the same manner as in Example 1.

(Preparation of a Silica-supported Catalyst)

1.14 g of bis(hydrogenated tallow alkyl)methylammonium tris(pentafluorophenyl)(4-hydroxyphenyl)borate (hereinafter, referred to simply as "borate") was added to and dissolved into 10 ml of toluene, to thereby obtain a 100 mM toluene solution of the borate.

5 ml of a 0.1 M toluene solution of trimethylaluminum was added to the obtained toluene solution of the borate at room temperature, and then, toluene was further added thereto so that the concentration of the borate became 50 mM, followed by stirring at room temperature for one hour, to thereby obtain a reaction mixture containing the borate.

1.6 ml of the above-obtained reaction mixture containing the borate was added to 50 ml of the above-obtained slurry of the (triethylaluminum-treated) silica, followed by stirring for one hour, to thereby cause the borate to be supported on the silica, thus obtaining a slurry of a silica having supported thereon the borate.

To the above-obtained slurry was added 0.6 ml of a solution obtained by dissolving 10 mmol of [(N-t-butylamido)(tetramethyl-$\eta^5$-cyclopentadienyl)dimethylsilane]titanium 1,3-pentadiene (hereinafter, referred to as "titanium complex") in 100 ml of ISOPAR E, and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the resultant reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

The copolymerization was conducted in substantially the same manner as in Example 1. After completion of the copolymerization, the resultant reaction mixture (which was a slurry of a copolymer) was taken out of the autoclave, and the catalyst was deactivated with methanol, and the reaction mixture was subjected to filtration, washing and drying, to thereby obtain 98 g of a dry powder of copolymer. When the inside of the autoclave was examined, no polymer adhering to the inner wall and the like of the autoclave was observed. The catalytic activity of the catalyst was 2,700 kg of polymer/g-Ti·hr.

The obtained powder of copolymer had an average particle diameter of about 300 μm and a bulk density of 0.29 g/cm$^3$, and exhibited an extremely excellent fluidity. Thus, the obtained powder of copolymer was found to exhibit excellent powder characteristics.

The results are shown in Table 1.

EXAMPLE 4

(Preparation of a Triethylaluminum-treated Silica)

50 ml of a slurry of a triethylaluminum-treated silica was obtained in substantially the same manner as in Example 1.

(Preparation of a Silica-supported Catalyst)

1.14 g of bis(hydrogenated tallow alkyl)methylammonium tris(pentafluorophenyl)(4-hydroxyphenyl)borate (hereinafter, referred to simply as "borate") was added to and dissolved into 10 ml of toluene, to thereby obtain a 100 mM toluene solution of the borate.

2.5 ml of a 0.1 M toluene solution of ethoxydiethylaluminum was added to the obtained toluene solution of the borate at room temperature, and then, toluene was further added thereto so that the concentration of the borate became 50 mM, followed by stirring at room temperature for one hour, to thereby obtain a reaction mixture containing the borate.

0.2 ml of a 0.1 M toluene solution of diethylethoxyaluminum was added to 50 ml of the above-obtained slurry of the triethylaluminum-treated silica, followed by stirring for 15 minutes, to thereby obtain a mixture. Subsequently, the above-obtained reaction mixture containing the borate was added to the above-obtained mixture, to thereby cause the borate to be supported on the silica, thus obtaining a slurry of a silica having supported thereon the borate.

To the above-obtained slurry was added 0.6 ml of a solution obtained by dissolving 10 mmol of [(N-t-butylamido)(tetramethyl-$\eta^5$-cyclopentadienyl)dimethylsilane]titanium 1,3-pentadiene (hereinafter, referred to as "titanium complex") in 100 ml of ISOPAR E, and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the resultant reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

The copolymerization was conducted in substantially the same manner as in Example 1. After completion of the copolymerization, the resultant reaction mixture (which was a slurry of a copolymer) was taken out of the autoclave, and the catalyst was deactivated with methanol, and the reaction mixture was subjected to filtration, washing and drying, to thereby obtain 83 g of a dry powder of copolymer. When the inside of the autoclave was examined, no polymer adhering to the inner wall and the like of the autoclave was observed. The catalytic activity of the catalyst was 1,750 kg of polymer/g-Ti·hr.

The obtained powder of copolymer had an average particle diameter of about 400 μm and a bulk density of 0.28 g/cm$^3$, and exhibited an extremely excellent fluidity. Thus, the obtained powder of copolymer was found to exhibit excellent powder characteristics.

The results are shown in Table 1.

EXAMPLE 5

(Preparation of a Triethylaluminum-treated Silica)

50 ml of a slurry of a triethylaluminum-treated silica was obtained in substantially the same manner as in Example 1.

(Preparation of a Silica-supported Catalyst)

1.14 g of bis(hydrogenated tallow alkyl)methylammonium tris(pentafluorophenyl)(4-hydroxyphenyl)borate (hereinafter, referred to simply as "borate") was added to and dissolved into 10 ml of toluene, to thereby obtain a 100 mM toluene solution of the borate.

110 ml of a 0.1 M toluene solution of ethoxydiethlaluminum was added to the obtained toluene solution of the borate at room temperature, and then, toluene was further added thereto so that the concentration of the borate became 50 mM, followed by stirring at room temperature for one hour, to thereby obtain a reaction mixture containing the borate.

1.6 ml of the above-obtained reaction mixture containing the borate was added to 50 ml of the above-obtained slurry of the (triethylaluminum-treated) silica, followed by stirring for one hour, to thereby cause the borate to be supported on the silica, thus obtaining a slurry of a silica having supported thereon the borate.

To the above-obtained slurry was added 0.6 ml of a solution obtained by dissolving 10 mmol of [(N-t-butylamido)(tetramethyl-$\eta^5$-cyclopentadienyl)dimethylsilane]titanium 3]pentadiene (hereinafter, referred to as "titanium complex") in 100 ml of ISOPAR E, and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the resultant reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

The copolymerization was conducted in substantially the same manner as in Example 1. After completion of the copolymerization, the resultant reaction mixture (which was a slurry of a copolymer) was taken out of the autoclave, and the catalyst was deactivated with methanol, and the re action mixture was subjected to filtration, washing and drying, to thereby obtain 90 g of a dry powder of copolymer. When the inside of the autoclave was examined, no polymer adhering to the inner wall and the like of the autoclave was observed. The catalytic activity of the catalyst was 2,500 kg of polymer/g-Ti·hr.

The obtained powder of copolymer had an average particle diameter of about 300 μm and a bulk density of 0.29 g/cm$^3$, and exhibited an extremely excellent fluidity. Thus, the obtained powder of copolymer was found to exhibit excellent powder characteristics.

The results are shown in Table 1.

EXAMPLE 6

(Preparation of a Triethylaluminum-treated Silica)

1 g of silica P-10 (manufactured and sold by Fuji Silysia Chemical Ltd., Japan) was calcined at 500° C. in a nitrogen atmosphere for 6 hours to effect dehydration of the silica P-10. The amount of hydroxyl groups on the surface of the dehydrated silica was 1.1 mmol/g of $SiO_2$. 1 g of the dehydrated silica was dispersed in 40 ml of hexane, to thereby obtain a slurry. To the obtained slurry was added 5 ml of a 1 M hexane solution of triethylaluminum, and the resultant mixture was stirred for one hour to effect a reaction of the triethylaluminum with the hydroxyl groups on the surface of the silica, thereby obtaining a reaction mixture containing a triethylaluminum-treated silica and a supernatant, wherein each of the hydroxyl groups on the surface of the triethylaluminum-treated silica was blocked. Subsequently, the supernatant contained in the reaction mixture was removed by decantation, followed by adding an appropriate amount of hexane, thereby dispersing the triethylaluminum-treated silica in hexane. This operation was repeated 5 times so that unreacted triethylaluminum contained in the supernatant was removed, followed by adding thereto an appropriate amount of hexane, thereby obtaining a slurry of triethylaluminum-treated silica in hexane having a volume of 50 ml. All of the supernatants removed by decantation were combined together, and subjected to the test for measuring the amount of triethylaluminum contained in the supernatant. As a result, it was found that the supernatant contained 3.75 mmol of triethylaluminum.

(Preparation of a Silica-supported Satalyst)

1.14 g of bis(hydrogenated tallow alkyl)methylammonium tris(pentafluorophenyl)(4-hydroxyphenyl)borate (hereinafter, referred to simply as "borate") was added to and dissolved into 10 ml of toluene, to thereby obtain a 100 mM toluene solution of the borate.

0.018 ml of ethanol was gradually added to 3 ml of a 0.1 M toluene solution of trimethylaluminum at 0° C. over 30 minutes, and then the resultant mixture was heated to 70° C., followed by stirring at 70° C. for one hour, to thereby obtain a reaction mixture. The obtained reaction mixture was added to the above-obtained toluene solution of the borate at room temperature, and then, toluene was further added thereto so that the concentration of the borate became 50 mM, followed by stirring at room temperature for one hour, to thereby obtain a reaction mixture containing the borate.

1.6 ml of the above-obtained reaction mixture containing the borate was added to 50 ml of the above-obtained slurry of the (triethylaluminum-treated) silica, followed by stirring for one hour, to thereby cause the borate to be supported on the silica, thus obtaining a slurry of a silica having supported thereon the borate.

To the above-obtained slurry was added 0.6 ml of a solution obtained by dissolving 10 mmol of [(N-t-butylamido)(tetramethyl-$\eta^5$-cyclopentadienyl) dimethylsilane]titanium 1,3-pentadiene (hereinafter, referred to as "titanium complex") in 100 ml of ISOPAR E (tradename of a liquid hydrocarbon mixture manufactured and sold by Exxon Chemical Co., USA), and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the resultant reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

800 ml of hexane was charged into a 1.8-liter autoclave, and then, pressurized ethylene was introduced into the autoclave to elevate the internal pressure of the autoclave to 10 kg/cm$^2$-G, followed by introduction of 5 ml of 1-butene to the autoclave. Then, the internal temperature of the autoclave was elevated to 70° C., and the above-obtained slurry of a solid catalyst was charged into the autoclave in an amount of 15 mg in terms of the weight of the solid catalyst, to thereby start copolymerization of ethylene with 1-butene. The copolymerization was performed for 30 minutes, while introducing ethylene into the autoclave so as to maintain the internal pressure of the autoclave at 10 kg/cm$^2$-G. After completion of the copolymerization, the resultant reaction mixture (which was a slurry of a copolymer) was taken out of the autoclave, and the catalyst was deactivated with methanol, and the reaction mixture was subjected to filtration, washing and drying, to thereby obtain 70 g of a dry powder of copolymer. When the inside of the autoclave was examined, no polymer adhering to the inner wall and the like of the autoclave was observed. The catalytic activity of the catalyst was 1,960 kg of polymer/g-Ti·hr.

The obtained powder of copolymer had an average particle diameter of about 400 μm and a bulk density of 0.28 g/cm$^3$, and exhibited an extremely excellent fluidity. Thus, the obtained powder of a copolymer was found to exhibit excellent powder characteristics.

The results are shown in Table 1.

EXAMPLE 7

(Preparation of a Triethylaluminum-treated Silica)

50 ml of a slurry of a triethylaluminum-treated silica was obtained in substantially the same manner as in Example 6.

To the obtained slurry of triethylaluminum-treated silica was added 0.4 ml of the reaction mixture obtained by mixing and reacting 5 mmol of trimethylaluminum with 5 mmol of ethyl alcohol in hexane, wherein the concentration of the aluminum compound in terms of trimethylaluminum was adjusted to 0.1 M, to thereby obtain a slurry of the silica containing an aluminum compound.

(Preparation of a Silica-supported Catalyst)

1.14 g of bis(hydrogenated tallow alkyl) methylammonium tris(pentafluorophenyl)(4-hydroxyphenyl)borate (hereinafter, referred to simply as "borate") was added to and dissolved into 10 ml of toluene, to thereby obtain a 100 mM toluene solution of the borate.

0.018 ml of ethanol was gradually added to 3 ml of a 0.1 M toluene solution of trimethylaluminum at 0° C. over 30 minutes, and then the resultant mixture was heated to 70° C., followed by stirring at 70° C. for one hour, to thereby obtain a reaction mixture. The obtained reaction mixture was added to the above-obtained toluene solution of the borate at room temperature, and then, toluene was further added thereto so that the concentration of the borate became 50 mM, followed by stirring at room temperature for one hour, to thereby obtain a reaction mixture containing the borate.

1.6 ml of the above-obtained reaction mixture containing the borate was added to 50 ml of the above-obtained slurry of the (triethylaluminum-treated) silica, followed by stirring for one hour, to thereby cause the borate to be supported on the silica, thus obtaining a slurry of a silica having supported thereon the borate.

To the above-obtained slurry was added 0.8 ml of a solution obtained by dissolving 10 mmol of [(N-t-butylamido)(tetramethyl-$\eta^5$-cyclopentadienyl) dimethylsilane]titanium 1,3-pentadiene (hereinafter, referred to as "titanium complex") in 100 ml of ISOPAR E, and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the resultant reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

The copolymerization was conducted in substantially the same manner as in Example 1, using the above-obtained slurry of a solid catalyst in an amount of 15 mg in terms of the weight of the solid catalyst. After completion of the copolymerization, the resultant reaction mixture (which was a slurry of a copolymer) was taken out of the autoclave, and the catalyst was deactivated with methanol, and the reaction mixture was subjected to filtration, washing and drying, to thereby obtain 80 g of a dry powder of copolymer. When the inside of the autoclave was examined, no polymer adhering to the inner wall and the like of the autoclave was observed. The catalytic activity of the catalyst was 2,090 kg of polymer/g-Ti·hr.

The obtained powder of copolymer had an average particle diameter of about 400 μm and a bulk density of 0.28 g/cm$^3$, and exhibited an extremely excellent fluidity. Thus, the obtained powder of copolymer was found to exhibit excellent powder characteristics.

The results are shown in Table 1.

EXAMPLE 8

(Preparation of a Triethylaluminum-treated Silica)

50 ml of a slurry of a triethylaluminum-treated silica was obtained in substantially the same manner as in Example 6.

(Preparation of a Silica-supported Catalyst)

1.14 g of bis(hydrogenated tallow alkyl) methylammonium tris(pentafluorophenyl)(4-hydroxyphenyl)borate (hereinafter, referred to simply as "borate") was added to and dissolved into to 10 ml of toluene, to thereby obtain a 100 mM toluene solution of the borate.

0.5 ml of a 1 M toluene solution of ethoxydiethylaluminum was added to the obtained toluene solution of the borate at room temperature, and then, toluene was further added thereto so that the concentration of the borate became 50 mM, followed by stirring at room temperature for one hour, to thereby obtain a reaction mixture containing the borate.

1.6 ml of the above-obtained reaction mixture containing the borate was added to 50 ml of the above-obtained slurry of the (triethylaluminum-treated) silica, followed by stirring for one hour, to thereby cause the borate to be supported on the silica, thus obtaining a slurry of a silica having supported thereon the borate.

To the above-obtained slurry was added 0.8 ml of a solution obtained by dissolving 10 mmol of [(N-t-butylamido)(tetramethyl-$\eta^5$-cyclopentadienyl) dimethylsilane]titanium 1,3-pentadiene (hereinafter "titanium complex") in 100 ml of ISOPAR E, and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the resultant reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

The copolymerization was conducted in substantially the same manner as in Example 1, using the above-obtained slurry of a solid catalyst in an amount of 15 mg in terms of the weight of the solid catalyst. After completion of the copolymerization, the resultant reaction mixture (which was a slurry of a copolymer) was taken out of the autoclave, and the catalyst was deactivated with methanol, and the reaction mixture was subjected to filtration, washing and drying, to thereby obtain 90 g of a dry powder of copolymer. When the inside of the autoclave was examined, no polymer adhering to the inner wall and the like of the autoclave was observed. The catalytic activity of the catalyst was 1,900 kg of polymer/g-Ti·hr.

The obtained powder of copolymer had an average particle diameter of about 400 $\mu$m and a bulk density of 0.28 g/cm$^3$, and exhibited an extremely excellent fluidity. Thus, the obtained powder of copolymer was found to exhibit excellent powder characteristics.

The results are shown in Table 1.

COMPARATIVE EXAMPLE 1

(Preparation of a Triethylaluminum-treated Silica)

1 g of silica P-10 (manufactured and sold by Fuji Silysia Chemical Ltd., Japan) was calcined at 500° C. in a nitrogen atmosphere for 6 hours to effect dehydration of the silica P-10. The amount of hydroxyl groups on the surface of the dehydrated silica was 1.1 mmol/g of SiO$_2$. 1 g of the dehydrated silica was dispersed in 40 ml of hexane, to thereby obtain a slurry. To the obtained slurry was added 2.5 ml of a 1 M hexane solution of triethylaluminum, and the resultant mixture was stirred for one hour to effect a reaction of the triethylaluminum with the hydroxyl groups on the surface of the silica, thereby obtaining a reaction mixture containing a triethylaluminum-treated silica and a supernatant, wherein each of the hydroxyl groups on the surface of the triethylaluminum-treated silica was blocked.

Then, the obtained reaction mixture was subjected to filtration in a nitrogen atmosphere and the triethylaluminum-treated silica on the filter paper was washed with 100 ml of hexane having a temperature of 50° C. The thus washed silica was dispersed again in 40 ml of hexane at 50° C., followed by stirring at 50° C. for 30 minutes. This operation was repeated 5 times. After the 5 times of washing operations, the silica was dispersed in an appropriate amount of hexane, to thereby obtain a slurry containing the silica and a supernatant and having a volume of 50 ml. As a result of the test for measuring the amount of the triethylaluminum remaining in the supernatant of the slurry, no triethylaluminum was detected. Therefore, it was confirmed that the slurry contains substantially no triethylaluminum.

(Preparation of a Silica-supported Catalyst)

1.14 g of bis(hydrogenated tallow alkyl) methylammonium tris(pentafluorophenyl)(4-hydroxyphenyl)borate (hereinafter, referred to simply as "borate") was added to and dissolved into an appropriate amount of toluene, to thereby obtain a 50 mM toluene solution of the borate.

1.6 ml of the above-obtained solution containing the borate was added to 50 ml of the above-obtained slurry of the (triethylaluminum-treated) silica, followed by stirring for one hour, to thereby cause the borate to be supported on the silica, thus obtaining a slurry of a silica having supported thereon the borate.

To the above-obtained slurry was added 0.8 ml of a solution obtained by dissolving 10 mmol of [(N-t-butylamido)(tetramethyl-$\eta^5$-cyclopentadienyl) dimethylsilane]titanium 1,3-pentadiene (hereinafter, referred to as "titanium complex") in 100 ml of ISOPAR E, and the resultant mixture was stirred for 3 hours to effect a reaction of the titanium complex with the borate, thereby obtaining a reaction mixture containing the silica and a supernatant, wherein a catalytically active species was formed on the silica. A part of the supernatant of the reaction mixture was removed by decantation and the concentration of silica in the slurry was adjusted using hexane as a solvent so that 50 ml of a pale green slurry of a solid catalyst in hexane was obtained, wherein the solid catalyst comprised the silica carrier having supported thereon the catalytically active species.

(Copolymerization of Ethylene With 1-butene)

800 ml of hexane was charged into a 1.8-liter autoclave, and then, pressurized ethylene was introduced into the autoclave to elevate the internal pressure of the autoclave to 10 kg/cm$^2$-G, followed by introduction of 5 ml of 1-butene to the autoclave. Then, the internal temperature of the autoclave was elevated to 70° C., and the above-obtained slurry of a solid catalyst was charged into the autoclave in an amount of 15 mg in terms of the weight of the solid catalyst, to thereby start copolymerization of ethylene with 1-butene. The copolymerization was performed for 60 minutes, while introducing ethylene into the autoclave so as to maintain the internal pressure of the autoclave at 10 kg/cm$^2$-G. After completion of the copolymerization, the resultant reaction mixture (which was a slurry of a copolymer) was taken out of the autoclave, and the catalyst was deactivated with methanol, and the reaction mixture was subjected to filtration, washing and drying, to thereby obtain 65 g of a dry powder of copolymer. When the inside of the autoclave was examined, no polymer adhering to the inner wall and the like of the autoclave was observed. However, the catalytic activity of the catalyst was as low as 1,350 kg of polymer/g-Ti·hr.

The obtained powder of copolymer had an average particle diameter of about 400 $\mu$m, and exhibited an extremely excellent fluidity. However, the bulk density of the powder of copolymer was as low as 0.23 g/cm$^3$.

The results are shown in Table 1.

EXAMPLE 9

(Preparation of a Silica-supported Catalyst)

Substantially the same procedure for the catalyst production as in Example 1 was repeated, except that the amounts of the raw materials used were increased, while maintaining the amount ratio of the raw materials, so as to obtain a slurry containing 2 kg of the same solid catalyst as produced in Example 1.

(Copolymerization of Ethylene With 1-hexene)

In the presence of the above-obtained solid catalyst in a slurry form; continuous copolymerization of ethylene with 1-hexene was conducted in a pilot plant for about 7 days. The continuous-copolymerization conditions were as follows. The internal pressure of the reactor was maintained at 10 kg/cm$^2$-G by supplying ethylene. The reaction temperature was 70° C. The copolymerization rate was maintained at 10 kg/hr. Further, 1-hexene was continuously fed so that the density of the copolymer became 0.950 g/cm$^3$. In addition, hydrogen gas was continuously fed so that the melt flow rate (hereinbelow, referred to as "MFR") of the copolymer became 3 in terms of the melt index (hereinbelow, referred to as "MI").

After completion of the continuous copolymerization, the reactor was opened. When the inside of the reactor was examined, no polymer adhering to the inner wall and the like of the reactor was observed. The catalytic activity of the catalyst was 1,730 kg of polymer/g-Ti·hr.

The obtained powder of copolymer had an extremely high bulk density of 0.38 g/cm$^3$ and an average particle diameter of about 250 μm, and had a sufficient fluidity for practical use.

The results are shown in Table 2.

EXAMPLE 10

(Copolymerization of ethylene With 1-butene)

Continuous copolymerization of ethylene with 1-butene was conducted in a pilot plant for about 7 days in substantially the same manner as in Example 9, except that 1-butene was used instead of 1-hexene.

The continuous-copolymerization conditions were as follows. The internal pressure of the reactor was maintained at 10 kg/cm$^2$-G by supplying ethylene. The reaction temperature was 70° C. The copolymerization rate was maintained at 10 kg/hr. Further, 1-butene was continuously fed so that the density of the copolymer became 0.935 g/cm$^3$. In addition, hydrogen gas was continuously fed so that the MFR of the copolymer became 1 in terms of the MI.

After completion of the continuous copolymerization performed for about 7 days, the reactor was opened. When the inside of the reactor was examined, no polymer adhering to the inner wall and the like of the reactor was observed. The catalytic activity of the catalyst was 1,850 kg of polymer/g-Ti·hr.

The obtained powder of copolymer had a high bulk density of 0.39 g/cm$^3$ and an average particle diameter of about 250 μm, and had a sufficient fluidity for practical use.

The results are shown in Table 2.

EXAMPLE 11

(Preparation of a Triethylaluminum-treated Silica)

100 kg of silica P-10 (manufactured and sold by Fuji Silysia Chemical Ltd., Japan) was calcined at 400° C. in a nitrogen atmosphere for 5 hours to effect dehydration of the silica P-10. The amount of hydroxyl groups on the surface of the dehydrated silica was 1.3 mmol/g of SiO$_2$. 100 kg of the dehydrated silica was dispersed in 2.5 m$^3$ of hexane, to thereby obtain a slurry. To the obtained slurry was added 150 liters of 1 M hexane solution of triethylaluminum, and the resultant mixture was stirred for one hour to chemically treat the hydroxyl groups on the silica with triethylaluminum, thereby obtaining a reaction mixture containing a triethylaluminum-treated silica and a supernatant, wherein each of the hydroxyl groups on the surface of the triethylaluminum-treated silica was blocked. Subsequently, 2 m$^3$ of the supernatant contained in the reaction mixture was removed by decantation, so that a part of unreacted triethylaluminum contained in the supernatant was removed, and, instead, 2 m$^3$ of hexane was added to the reaction mixture, thereby obtaining a slurry of triethylaluminum-treated silica in hexane. In the above-mentioned 2 m$^3$ of the supernatant removed, approximately 5 moles of triethylaluminum was contained.

(Preparation of a Silica-supported Catalyst)

9.1 kg of bis(hydrogenated tallow alkyl) methylammonium tris(pentafluorophenyl)(4-hydroxyphenyl)borate (hereinafter, referred to simply as "borate") was added to and dissolved into 133 liters of toluene, to thereby obtain a 60 mM toluene solution of the borate. To the obtained solution was added 2.4 liters of a 1 M hexane solution of triethylaluminum to effect a reaction of the borate with triethylaluminum, thereby obtaining a reaction mixture.

The above-obtained reaction mixture was added to the above-obtained slurry of the (triethylaluminum-treated) silica while maintaining the temperature at 15° C., to thereby cause the borate to be supported on the silica, thus obtaining a slurry of a silica having supported thereon the borate.

To the above-obtained slurry was added 60 liters of a 0.1 M solution of [(N-t-butylamido)(tetramethyl-η$^5$-cyclopentadienyl)dimethylsilane]titanium 1,3-pentadiene (hereinafter, referred to as "titanium complex") in ISOPAR E while maintaining the temperature at 15° C., and the resultant mixture was stirred for 3 hours to effect a reaction of the titanium complex with the borate, thereby obtaining a reaction mixture containing the silica and a supernatant, wherein a catalytically active species was formed on the silica. After the reaction mixture was allowed to stand, 2 m$^3$ of the supernatant of the reaction mixture was removed by decantation and the concentration of silica in the slurry was adjusted using hexane as a solvent so that a pale green slurry of a solid catalyst in hexane was obtained, wherein the solid catalyst comprised a silica carrier having supported thereon the catalytically active species.

(Copolymerization of Ethylene With 1-butene)

In the presence of the above-obtained solid catalyst in slurry form, continuous copolymerization of ethylene with 1-butene was conducted in a commercial scale pilot plant for about 4 days. The continuous copolymerization conditions were as follows. The internal pressure of the reactor was maintained at 10 kg/cm$^2$-G by supplying ethylene. The reaction temperature was 75° C. The copolymerization rate was maintained at 10 kg/hr. Further, 1-butene was continuously fed so that the density of the copolymer became 0.941 g/cm$^3$. In addition, hydrogen gas was continuously fed so that the MFR of the copolymer became 5 in terms of the MI.

After completion of the continuous copolymerization, the reactor was opened. When the inside of the reactor was examined, no polymer adhering to the inner wall and the like of the reactor was observed. The catalytic activity of the catalyst was 2,050 kg of polymer/g-Ti·hr.

The obtained powder of copolymer had an extremely high bulk density of 0.33 g/cm$^3$ and an average particle diameter of about 300 μm, and had a sufficient fluidity for practical use.

The results are shown in Table 2.

COMPARATIVE EXAMPLE 2

(Preparation of a Triethylaluminum-treated Silica)

In substantially the same manner-as in Example 1, 50 liters of a slurry corresponding to 1 kg of the triethylaluminum-treated silica were obtained.

(Preparation of a Silica-supported Catalyst)

50 moles of triethylaluminum were added to 10 liters of a 100 mM solution of bis(hydrogenated tallow alkyl) methylammonium tris(pentafluorophenyl)(4-hydroxyphenyl)borate (hereinafter, referred to simply as "borate"), which solution obtained in substantially the same manner as in Example 1, and then, toluene was further added thereto so that the concentration of the borate became 50 mM, followed by stirring, to thereby obtain a reaction mixture containing borate. 1.6 liters of the obtained reaction mixture was added to 50 liters of the above-obtained slurry of a silica, followed by stirring for one hour.

Further, to the resultant mixture was added 0.8 liter of a solution obtained by dissolving 10 moles of [(N-t-butylamido)(tetramethyl-$\eta^5$-cyclopentadienyl)dimethylsilane]titanium 1,3-pentadiene (hereinafter, referred to as "titanium complex") in 100 liters of ISOPAR E, and the resultant mixture was stirred for 3 hours to effect a reaction of the titanium complex with the borate, thereby obtaining a reaction mixture containing the silica and a supernatant, wherein a catalytically active species was formed on the silica. The supernatant of the reaction mixture was removed by decantation and the concentration of silica in the slurry was adjusted using hexane as a solvent so that a pale green slurry of a solid catalyst in hexane, comprising a silica carrier having supported thereon catalytically active species was obtained.

(Copolymerization of Ethylene With 1-hexene)

In the presence of the above-obtained solid catalyst in slurry form, continuous copolymerization of ethylene with 1-hexene was conducted in substantially the same manner as in Example 4, to thereby obtain a copolymer of ethylene with 1-hexene. The catalytic activity of the catalyst was about 5,500 g of polymer/g of the catalyst.

After completion of the continuous operation, the reactor was opened. When the inside of the reactor was examined, adhesion of polymer to the inner wall and the like of the reactor was observed. The catalytic activity of the catalyst was 1,350 kg of polymer/g-Ti·hr.

The obtained powder of copolymer had an average particle diameter of about 200 μm and a bulk density was 0.23 g/cm$^3$.

The results are shown in Table 2.

TABLE 1

| No. | AlR$_n$X$_{3-n}$ | AlR$_n$X$_{3-n}$/Borate Ratio | Borate (μmol/g SiO$_2$) | Ti (μmol/g SiO$_2$) | Comonomer | Time (min) | Yield (g) | Activity (kg of polymer g-Ti·hr) | Bulk Density (g/cm$^3$) | Average Diameter (μm) | Reactor Fouling* |
|---|---|---|---|---|---|---|---|---|---|---|---|
| Example 1 | AlMe$_3$ | 0.1 | 80 | 80 | 1-butene | 60 | 90 | 1,900 | 0.26 | 400 | Not Observed |
| Example 2 | AlMe$_3$ | 0.05 | 80 | 60 | 1-butene | 60 | 85 | 1,800 | 0.26 | 400 | Not Observed |
| Example 3 | AlEt$_3$ | 0.5 | 80 | 60 | 1-butene | 60 | 98 | 2,700 | 0.29 | 300 | Not observed |
| Example 4 | AlEt$_2$(OEt) | 0.25 | 80 | 80 | 1-butene | 60 | 83 | 1,750 | 0.28 | 400 | Not observed |
| Example 5 | AlEt$_2$(OEt) | 1 | 80 | 60 | 1-butene | 60 | 90 | 2,500 | 0.28 | 400 | Not observed |
| Example 6 | AlMe$_2$ +EtOH | 0.3 | 80 | 60 | 1-butene | 60 | 70 | 1,960 | 0.28 | 400 | Not observed |
| Example 7 | AlMe$_2$ +EtOH | 0.3 | 80 | 80 | 1-butene | 60 | 80 | 2,090 | 0.28 | 400 | Not observed |
| Example 8 | AlEt$_2$(OEt) | 0.5 | 80 | 80 | 1-butene | 60 | 90 | 1,900 | 0.28 | 400 | Not observed |
| Comparative Example 1 | Not used | Not used | 80 | 80 | 1-butene | 60 | 65 | 1,350 | 0.23 | 400 | Not observed |

*Note
"Reactor Fouling" means the occurrence of adhesion of ethylene polymer to the inside surfaces associated with the autoclave or reactor.

TABLE 2

| No. | AlR$_n$X$_{3-n}$ | AlR$_n$X$_{3-n}$/Borate Ratio | Borate (μmol/g SiO$_2$) | Ti (μmol/g SiO$_2$) | Comonomer | MI (g/10 min.) | Density (g/cm$^3$) | Activity (kg of polymer g-Ti·hr) | Bulk Density (g/cm$^3$) | Average Diameter (μm) | Reactor Fouling* |
|---|---|---|---|---|---|---|---|---|---|---|---|
| Example 9 | AlMe$_3$ + EtOH | 0.3 | 80 | 60 | 1-hexene | 3 | 0.950 | 1,730 | 0.38 | 250 | Not Observed |
| Example 10 | AlMe$_3$ + EtOH | 0.3 | 80 | 60 | 1-butene | 1 | 0.935 | 1,850 | 0.39 | 250 | Not Observed |
| Example 11 | AlEt$_3$ | 0.3 | 80 | 60 | 1-butene | 5 | 0.941 | 2,050 | 0.33 | 300 | Not Observed |
| Comparative Example 2 | AlEt$_3$ | 50 | 80 | 80 | 1-hexene | 3 | 0.950 | 1,720 | 0.23 | 200 | Observed |

*Note
"Reactor Fouling" means the occurrence of adhesion of ethylene polymer to the inside surfaces associated with the autoclave or reactor.

INDUSTRIAL APPLICABILITY

The olefin polymerization catalyst of the present invention is advantageous not only in that it has high polymerization activity, but also in that an olefin polymer having excellent powder characteristics can be produced by suspension polymerization (slurry polymerization) or gaseous phase polymerization, while preventing the occurrence of adherence of the polymer to the inner wall, agitation blades and the like of a polymerizer. By virtue of such excellent properties, the catalyst of the present invention enables an olefin polymer having excellent powder characteristics to be efficiently produced by a continuous operation of a commercial scale plant. The olefin polymer produced using the catalyst of the present invention can be advantageously used in production of various articles, such as films, molded articles (such as blow-molded articles, injection-molded articles and rotomolded articles), fibers, pipes, and coating or jacketing materials for electric transmission cables or wires.

What is claimed is:

1. An olefin polymerization catalyst comprising:
   (A) a transition metal compound comprising titanium having η-bonded thereto a cyclic anionic ligand;
   (B) a mixture of:
     (B-1) an activator compound which is present in an amount 0.5 to 10 times the molar amount of said transition metal compound (A), and (B-2) an organometal compound which is present in an amount 0.05 to 20 times the molar amount of said activator compound (B-1), said activator compound (B-1) being capable of reacting with said transition metal compound (A) to form a metal complex having a catalytic activity;

said organometal compound (B-2) being represented by the following formula (1):

$$MR_nX_{m-n} \quad (1)$$

wherein

M represents an element selected from the group consisting of elements of Groups 1 to 15 of the Periodic Table, R each occurrence independently represents a $C_1$–$C_{12}$ linear, branched or cyclic alkyl group or a $C_6$–$C_{20}$ aryl group;

X each occurrence independently represents a halide, a hydride or a $C_1$–$C_{10}$ alkoxide group; and m represents a formal oxidation state of M, and n is an integer of from 1 to m, wherein m is as defined above, wherein the molar ratio of R group of said organometal compound (B-2) to said activator compound (B-1) is from 0.5 to 2;

(C) a solid component having no hydroxyl group; and optionally (D) an organoaluminum compound, said catalyst being obtained by contacting said components (A) to (C) and optionally said component (D);

wherein said transition metal compound (A) is represented by the following formula (6):

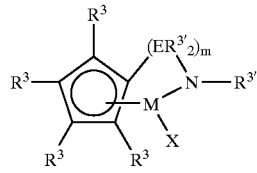
(6)

wherein:

M represents titanium;

X represents a neutral $C_4$–$C_{30}$ conjugated diene;

$R^3$ each occurrence independently represents a substituent selected from the group consisting of hydrogen, a $C_1$–$C_{10}$ hydrocarbon group, a silyl group and combinations thereof, with the proviso that, when said $R^3$ substituent is a $C_1$–$C_{10}$ hydrocarbon group or a silyl group, two adjacent $R^3$ substituents are optionally bonded together to form a divalent group, thereby forming a ring in cooperation with a bond between two carbon atoms on the cyclopentadienyl ring which are bonded to said two adjacent $R^3$ substituents, respectively;

$R^{3'}$ represents a $C_1$–$C_{10}$ hydrocarbyl group;

$R^{3''}$ each occurrence independently represents hydrogen or a $C_1$–$C_{10}$ hydrocarbyl group;

E each occurrence independently represents silicon or carbon; and m is 2;

wherein said activator compound (B-1) is represented by the following formula (9):

$$[L-H]^+[BQ_3Q']^- \quad (9)$$

wherein:

$[L-H]^+$ represents a proton-donating Brønsted acid wherein

L represents a neutral Lewis base containing carbon, nitrogen, phosphorus or sulfur; and $[BQ_3Q']^-$ represents a noncoordinating, compatible anion, wherein Q each occurrence independently represents a $C_6$–$C_{20}$ aryl group which is unsubstituted or substituted with at least one substituent selected from the group consisting of a $C_1$–$C_{12}$ hydrocarbon group and a halogen, and Q' represents a $C_6$–$C_{20}$ aryl group substituted with a hydroxyl group.

2. The catalyst according to claim 1, wherein

X represents a s-trans diene selected from the group consisting of s-trans-$\eta^4$-1,4-diphenyl-1,3-butadiene, s-trans-$\eta^4$-3-methyl-1,3-pentadiene, s-trans-$\eta^4$-1,4-dibenzyl-1,3-butadiene, s-trans-$\eta^4$-2,4-hexadiene, s-trans-$\eta^4$-1,3-pentadiene, s-trans-$\eta^4$-1,4-ditolyl-1,3-butadiene and s-trans-$\eta^4$-1,4-bis(trimethylsilyl)-1,3-butadiene, or represents a s-cis diene which forms a $\pi$-complex with M and which is selected from the group consisting of s-cis-$\eta^4$-1,4-diphenyl-1,3-butadiene, s-cis-$\eta^4$-3-methyl-1,3-pentadiene, s-cis-$\eta^4$-1,4-dibenzyl-1,3-butadiene, s-cis-$\eta^4$-2,4-hexadiene, s-cis-$\eta^4$-1,3-pentadiene, s-cis-$\eta^4$-1,4-ditolyl-1,3-butadiene and s-cis-$\eta^4$-1,4-bis(trimethylsilyl)-1,3-butadiene.

3. The catalyst according to any one of claims 1 and 2, wherein:

M in formula (1) represents an element selected from the group consisting of elements of Groups 2 and 13 to 15 of the Periodic Table; and R, X, m and n in formula (1) are as defined above for formula (1).

4. The catalyst according to any one of claim 1 and 2, wherein said organometal compound (B-2) is represented by the following formula (10):

$$AlR_nX_{3-n} \quad (10)$$

wherein

R each occurrence independently represents a $C_1$–$C_{12}$ linear, branched or cyclic alkyl group or a $C_6$–$C_{20}$ aryl group;

X each occurrence independently represents a halide, a hydride or a $C_1$–$C_{10}$ alkoxide group; and n is 1, 2 or 3.

5. The catalyst according to any one of claims 1 and 2, wherein said solid component (C) is at least one substance selected from the group consisting of silica, alumina, magnesia, magnesium chloride, zirconia, titania, boron oxide, calcium oxide, zinc oxide, barium oxide, vanadium (V) oxide, chromium oxide, thorium oxide, mixtures thereof and oxide complexes thereof, each having substantially no hydroxyl group.

6. The catalyst according to any one of claims 1 and 2, wherein said pretreated solid component (C) is a silica which has been treated with a method comprising: subjecting the silica to heat treatment at a temperature of 150° C. or more to thereby obtain a pretreated silica having hydroxyl groups on the surface thereof in an amount of from 0.05 to 10 mmol per gram of said silica; and treating said pretreated silica with an organometal compound which is used in an amount 1 to 5 times the molar amount of the hydroxyl groups on the surface of said pretreated silica.

7. The catalyst according to any one of claims 1 and 2, wherein said optional organoaluminum compound (D) of said catalyst being represented by the following formula (10):

$$AlR_nX_{3-n} \quad (10)$$

wherein

R each occurrence independently represents a $C_1$–$C_{12}$ linear, branched or cyclic alkyl group or a $C_6$–$C_{20}$ aryl group;

X each occurrence independently represents a halide, a hydride or a $C_1$–$C_{10}$ alkoxide group; and n is 1, 2 or 3.

8. The catalyst according to any one of claims 1 and 2, which is produced by a method comprising the steps of:

(i) intimately mixing and contacting said activator compound (B-1) and said organometal compound (B-2) with each other to form said component (B), (ii) intimately mixing and contacting said component (B) and said solid component (C) with each other, to thereby obtain a mixture of said components (B) and (C), and (iii) intimately mixing and contacting said transition metal compound (A) and said mixture of the components (B) and (C) with each other, wherein at least one member selected from the group consisting of said component (A) used in said step (iii) and said component (C) used in said step (ii) is optionally in the form of a mixture thereof with said component (D), and said component (D) is optionally added to the mixture which is obtained in said step (ii) before said step (iii).

9. A method for producing an ethylene homopolymer or an ethylne copolymer, which comprises homopolymerizing ethylene or copolymerizing ethylene with at least one comonomer selected from the group consisting of an α-olefin represented by the formula $H_2C=CHR$, wherein R is a methyl group, an ethyl group, a $C_3C_{18}$ linear, branched or cyclic alkyl group or a $C_6$–$C_{20}$ aryl group, a $C_3C_{20}$ cyclic olefin, and a $C_4$–$C_{20}$ linear, branched or cyclic diene, in the presence of the catalyst of claim 1.

* * * * *